(12) United States Patent
Nighman et al.

(10) Patent No.: US 12,413,904 B2
(45) Date of Patent: Sep. 9, 2025

(54) MULTI-SOURCE AUDIO PROCESSING SYSTEMS AND METHODS

(71) Applicant: QSC, LLC, Costa Mesa, CA (US)

(72) Inventors: Christopher Charles Nighman, Broomfield, CO (US); Gerrit Eimbertus Rosenboom, Longmont, CO (US); Alfredo Martin Aguilar, Chula Vista, CA (US); Matthew George Skogmo, Placentia, CA (US)

(73) Assignee: QSC, LLC, Costa Mesa, CA (US)

( * ) Notice: Subject to any disclaimer, the term of this patent is extended or adjusted under 35 U.S.C. 154(b) by 268 days.

(21) Appl. No.: 17/963,862

(22) Filed: Oct. 11, 2022

(65) Prior Publication Data

US 2023/0115674 A1   Apr. 13, 2023

Related U.S. Application Data

(60) Provisional application No. 63/254,901, filed on Oct. 12, 2021.

(51) Int. Cl.
*H04R 1/40* (2006.01)
*G10L 21/0208* (2013.01)
(Continued)

(52) U.S. Cl.
CPC .......... *H04R 1/406* (2013.01); *G10L 21/0208* (2013.01); *G10L 25/78* (2013.01);
(Continued)

(58) Field of Classification Search
CPC ........ H04R 1/406; H04R 3/005; H04R 27/00; H04R 2410/01; H04R 2430/23; H04B 17/318; G10L 21/0208; G10L 25/78; G10L 2021/02082; G10L 15/26; G10L 21/0272; H04N 7/15; H04M 3/56; H04M 3/568; H04M 7/006; H04M 2203/509
See application file for complete search history.

(56) References Cited

U.S. PATENT DOCUMENTS 6,215,404 B1 * 4/2001 Morales ............... G08B 25/006
340/541
8,249,867 B2   8/2012 Cho et al.
(Continued)

FOREIGN PATENT DOCUMENTS

JP       2008/236077 A      10/2008
KR     1020100066916 A       6/2010
WO    WO-2014063754 A1 *  5/2014 ............. G10L 21/02

OTHER PUBLICATIONS

International Search Report and Written Opinion received in Application No. PCT/US22/77882, dated Jan. 17, 2023, in 25 pages.
(Continued)

*Primary Examiner* — Carolyn R Edwards
*Assistant Examiner* — Kuassi A Ganmavo
(74) *Attorney, Agent, or Firm* — Haynes and Boone, LLP

(57) ABSTRACT

A conferencing system includes a plurality of microphones and an audio processing system that performs blind source separation operations on audio signals to identify different audio sources. The system processes the separated audio sources to identify or classify the sources and generates an output stream including the source separated content.

20 Claims, 18 Drawing Sheets

(51) Int. Cl.
| | |
|---|---|
| *G10L 21/0272* | (2013.01) |
| *G10L 21/0316* | (2013.01) |
| *G10L 25/78* | (2013.01) |
| *H04B 17/318* | (2015.01) |
| *H04M 3/56* | (2006.01) |
| *H04M 7/00* | (2006.01) |
| *H04M 9/08* | (2006.01) |
| *H04N 7/15* | (2006.01) |
| *H04R 3/00* | (2006.01) |
| *H04R 27/00* | (2006.01) |

(52) U.S. Cl.
CPC .. *H04B 17/318* (2015.01); *G10L 2021/02082* (2013.01); *G10L 21/0272* (2013.01); *G10L 21/0316* (2013.01); *H04M 3/56* (2013.01); *H04M 3/568* (2013.01); *H04M 7/006* (2013.01); *H04M 9/082* (2013.01); *H04M 2203/509* (2013.01); *H04N 7/15* (2013.01); *H04R 3/005* (2013.01); *H04R 27/00* (2013.01); *H04R 2410/01* (2013.01); *H04R 2430/23* (2013.01)

(56) References Cited

U.S. PATENT DOCUMENTS

| | | | | |
|---|---|---|---|---|
| 8,600,743 | B2* | 12/2013 | Lindahl | G10L 15/20 704/235 |
| 9,565,493 | B2 | 2/2017 | Abraham et al. | |
| 9,741,360 | B1 | 8/2017 | Li et al. | |
| 10,770,091 | B2 | 9/2020 | Kleijn et al. | |
| 2004/0175006 | A1 | 9/2004 | Kim et al. | |
| 2007/0021958 | A1* | 1/2007 | Visser | G10L 25/78 704/226 |
| 2008/0273476 | A1* | 11/2008 | Cohen | H04M 3/56 348/E7.083 |
| 2009/0089054 | A1* | 4/2009 | Wang | H04M 9/082 704/E15.039 |
| 2009/0164212 | A1 | 6/2009 | Chan et al. | |
| 2009/0226004 | A1 | 9/2009 | Sørensen | |
| 2011/0184721 | A1* | 7/2011 | Subramanian | G10L 19/0018 704/4 |
| 2011/0194701 | A1 | 8/2011 | Zhan et al. | |
| 2011/0238194 | A1* | 9/2011 | Rosenberg | G11B 27/105 700/94 |
| 2012/0099732 | A1* | 4/2012 | Visser | H04R 3/005 381/17 |
| 2012/0245933 | A1* | 9/2012 | Flaks | G10L 21/0272 381/1 |
| 2015/0078582 | A1 | 3/2015 | Graham et al. | |
| 2015/0242180 | A1* | 8/2015 | Boulanger-Lewandowski | G06N 3/044 700/94 |
| 2015/0279386 | A1* | 10/2015 | Skoglund | G10L 21/0208 704/226 |
| 2017/0076749 | A1* | 3/2017 | Kanevsky | H04M 3/568 |
| 2017/0084145 | A1* | 3/2017 | Nye | G08B 29/188 |
| 2017/0178664 | A1 | 6/2017 | Wingate et al. | |
| 2017/0323653 | A1* | 11/2017 | Hassan al Banna | G10L 25/84 |
| 2017/0374464 | A1 | 12/2017 | Kessner | |
| 2018/0277133 | A1* | 9/2018 | Deetz | H04M 3/568 |
| 2018/0308487 | A1* | 10/2018 | Goel | G10L 15/1815 |
| 2019/0139563 | A1* | 5/2019 | Chen | G06N 3/044 |
| 2019/0206417 | A1* | 7/2019 | Woodruff | G10L 21/028 |
| 2019/0220299 | A1 | 7/2019 | Rosenboom | |
| 2019/0220300 | A1 | 7/2019 | Rosenboom | |
| 2019/0239796 | A1* | 8/2019 | Avrahamson | A61B 5/0002 |
| 2019/0318759 | A1* | 10/2019 | Doshi | G10L 15/04 |
| 2019/0324117 | A1* | 10/2019 | Lin | G01S 3/808 |
| 2020/0137485 | A1* | 4/2020 | Yamakawa | H04R 3/005 |
| 2020/0167602 | A1 | 5/2020 | Betts | |
| 2020/0184985 | A1* | 6/2020 | Nesta | H04R 3/005 |
| 2020/0312342 | A1* | 10/2020 | Shanmugam | G10L 21/0216 |
| 2021/0092514 | A1 | 3/2021 | Agarwala et al. | |
| 2021/0271528 | A1 | 9/2021 | Rosenboom | |
| 2022/0272445 | A1* | 8/2022 | Singer | G10L 21/0272 |

OTHER PUBLICATIONS

Chan et al., "Uniform Concentric Circular Arrays With Frequency-Invariant Characteristics—Theory, Design, Adaptive Beamforming and DOA Estimation", IEEE Transactions on Signal Processing, vol. 55, No. 1, dated Jan. 2007.

Chou, "Frequency-Independent Beamformer with Low Response Error", The Institute of Electrical and Electronics Engineers, vol. 5, dated 1995.

Firoozabadi et al., "Combination of Nested Microphone Array and Subband Processing for Multiple Simultaneous Speaker Localization", 6$^{th}$ International Symposium on Telecommunications (IST), dated 2012.

Lai, "A Study into the Design of Steerable Microphones Arrays", Department of Electrical and Computer Engineering, dated Dec. 2012.

Roig et al., "Towards an enhanced performance of uniform circular arrays at low frequencies", Proceedings of Inter-Noise, dated Sep. 2013.

Tiete et al., "SoundCompass: A Distributed MEMS Microphone Array-Based Sensor for Sound Source Localization", Sensors, vol. 14, No. 2, dated 2014.

Luo, Yi et al., "Conv-TasNet: Surpassing Ideal Time-Frequency Magnitude Masking for Speech Separation," dated May 15, 2019, in 12 pages.

Extended Search Report issued for European Patent Application No. 22881945.4, dated Jun. 13, 2025, 9 pages.

Zheng et al., "Encoding and Communicating Navigable Speech Soundfields," Multimedia Tools and Applications, vol. 75, No. 9, pp. 5183-5204, Nov. 5, 2015.

* cited by examiner

Environment Table 400

| Venue Index | Venue Type | Venue ID | Venue Map/ Topography | Mics in Venue | Sources Detected in Venue |
|---|---|---|---|---|---|
| V1 | Conf. room | NY Conf. | [Pointer to map database] | *Ma, *Mb, *Mc | *Sa, *Sb |
| V2 | Conf. room | SF Conf. | [Pointer to map database] | *Md, *Me | *Sc, *Sd, *Se |
| V3 | Remote Connection | Employee 1 laptop | N/A | *Mc | *Sf, *Sg |
| ... | ... | ... | ... | ... | ... |
| Vn | | | | | |

Figure 4A

Source Table 402

| Index | Source Type | Source Sub-type | Unique Person ID | Unique ID Non-person | Source Location | Detecting Microphones | Source Position |
|---|---|---|---|---|---|---|---|
| S1 | Speech | Adult male voice | Employee 1 | N/A | *Va | *Ma, *Mb | Ma: 5ft, 150°<br>Mb: 10ft, 30° |
| S2 | Non-speech point | Electronic device | N/A | Employee 1 smart phone | *Va | *Ma, *Mb | Ma: 5ft, 150°<br>Mb: 10ft, 30° |
| S3 | Non-speech point | Typing | N/A | Employee 2 typing | *Vb | *Mb | Mb: 5ft, 15° |
| S4 | Speech | Adult female voice | Employee 2 | N/A | *Vb | *Mc, *Md | Mc: 8ft, 270°<br>Md: 5ft, 15° |
| S5 | Diffuse | Traffic noise | N/A | N/A | *Va | *Ma | N/A |
| ... | ... | ... | ... | ... | ... | ... | ... |
| Sn | | | | | | | |

Figure 4B

Microphone Table

| Index | Mic Type | Placement Category | Placement Venue | Venue Position | Detected Sources | Source Direction of Arrival | Detected Source SNR/level |
|---|---|---|---|---|---|---|---|
| M1 | Array Type 1 | Ceiling | *Va | X1, Y1, Z1 | *Sa, *Sb, *Sc | Sa DOA, Sb DOA, Sc DOA | Sa SNR, Sb SNR, Sc SNR |
| M2 | Array Type 1 | Wall | *Vb | X2, Y2, Z2 | *Sa, *Sb | Sa DOA, Sb DOA | Sa SNR, Sb SNR |
| M3 | Array Type 2 | Laptop | *Vc | X3, Y3, Z3 | *Sd | Sd DOA | Sd SNR |
| M4 | Single element mic | Podium/Table | *Va | X4, Y4, Z4 | *Sd | Sd DOA | Sd SNR |
| ... | ... | ... | ... | ... | | | |
| Mn | | | | | | | |

MULTI-SOURCE AUDIO PROCESSING SYSTEMS AND METHODS

CROSS REFERENCE TO PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND

The present disclosure relates generally to audio systems that process sound detected by one or more array microphones, or other types of microphones.

SUMMARY

In some aspects, the techniques described herein relate to a conferencing system including: a plurality of microphones, the plurality of microphones including at least first and second microphones positioned in a conferencing environment, the first microphone configured, responsive to detected sound, to generate at least one first audio signal, the second microphone configured, responsive to detected sound, to generate at least one second audio signal; and one or more processors executing an audio processing system and operatively coupled to the plurality of microphones. The audio processing system can be configured to: perform one or more blind source separation operations on the first audio signal to generate a first plurality of source-separated audio signals each corresponding to a different audio source; perform one or more blind source separation operations on the second audio signal to generate a second plurality of source-separated audio signals each corresponding to a different audio source; process a first source-separated signal of the first plurality of source-separated audio signals to identify a first type of audio source corresponding to the first source-separated signal; process a second source-separated signal of the second plurality of source-separated audio signals to identify a second type of audio source corresponding to the second source-separated signal; and generate an output audio stream including audio content from one or both of the first source-separated signal and the second source-separated signal. The output stream can be generated at least in part based on one or more of direction of arrival information and signal strength information.

In some aspects, the techniques described herein relate to a conferencing system wherein the first and second types of audio sources are the same type.

In some aspects, the techniques described herein relate to a conferencing system wherein the first and second source-separated signals correspond to the same human speaker speech source.

In some aspects, the techniques described herein relate to a conferencing system wherein the audio processing system is further configured to, using one or more of direction of arrival and signal strength information, determine a physical position of the human speaker, and to track the physical position of the human speaker as the human speaker moves.

In some aspects, the techniques described herein relate to a conferencing system wherein at least one of the first and second types is a speech source, and the audio processing system uses a voice activity detection technique to identify the speech source.

In some aspects, the techniques described herein relate to a conferencing system wherein the audio processing system is configured to use direction of arrival information relating to one or both of the first and second source-separated signals in generating the output audio stream.

In some aspects, the techniques described herein relate to a conferencing system wherein the audio processing system is configured to use signal strength information relating to one or both of the first and second source-separated signals in generating the output audio stream.

In some aspects, the techniques described herein relate to a conferencing system wherein the audio processing system is configured to apply a first audio signal processing operation on the first source-separated signal based on the identified first type, and to apply a second audio signal processing operation on the second source-separated signal based on at least the identified second type, wherein the first and second audio processing operations are different.

In some aspects, the techniques described herein relate to a conferencing system wherein the audio processing system is configured to: identify one or more residual echo signals amongst the first plurality of source-separated audio signals and the second plurality of source-separated audio signals; and enhance acoustic echo cancellation using the residual echo signals.

In some aspects, the techniques described herein relate to a conferencing system wherein one or more of the microphones include array microphones, and the audio processing system is configured to determine a direction of arrival of one or more of the first plurality of source-separated audio signals and one or more of the second plurality of source-separated audio signals based on based on time or phase delays between individual microphone elements of the array microphones.

In some aspects, the techniques described herein relate to a conferencing system wherein the first type is a noise source, the second type is a speech source, and the audio processing system is configured to omit or reduce a contribution from the first source-separated signal in the output audio stream relative to content from the second source-separated signal.

In some aspects, the techniques described herein relate to a conferencing method including: with one or more processors operatively coupled to a plurality of microphones positioned in a conferencing environment: performing one or more blind source separation operations on at least one first audio signal generated by a first microphone of the plurality of microphones to generate a first plurality of source-separated audio signals each corresponding to a different audio source; performing one or more blind source separation operations on at least one second audio signal generated by a second microphone of the plurality of microphones to generate a second plurality of source-separated audio signals each corresponding to a different audio source; processing a first source-separated signal of the first plurality of source-separated audio signals to identify a first type of audio source corresponding to the first source-separated signal; processing a second source-separated signal of the second plurality of source-separated audio signals to identify a second type of audio source corresponding to the second source-separated signal; and generating an output audio stream for playback. According to some embodiments, the output audio stream includes audio content from one or both of the first source-separated signal and the second source-separated signal. The generating of the output stream can be based at least in part on one or more of direction of arrival information and signal strength information.

In some aspects, the techniques described herein relate to a method wherein the first and second types of audio sources are the same type.

In some aspects, the techniques described herein relate to a method wherein the first and second source-separated signals correspond to the same human speaker speech source.

In some aspects, the techniques described herein relate to a method further including, with the one or more processors, using one or more of direction of arrival and signal strength information, determining a physical position of the human speaker, and tracking the physical position of the human speaker as the human speaker moves.

In some aspects, the techniques described herein relate to a method wherein at least one of the first and second types is a speech source, and the method includes using a voice activity detection technique to identify the speech source.

In some aspects, the techniques described herein relate to a method including, with the one or more processors, using direction of arrival information relating to one or both of the first and second source-separated signals in generating the output audio stream.

In some aspects, the techniques described herein relate to a method including, with the one or more processors, using signal strength information relating to one or both of the first and second source-separated signals in generating the output audio stream.

In some aspects, the techniques described herein relate to a method further including, with the one or more processors, applying a first audio signal processing operation on the first source-separated audio signal based on the identified first type, and applying a second audio signal processing operation on the second source-separated audio signal based on at least the identified second type, wherein the first and second audio processing operations are different.

In some aspects, the techniques described herein relate to a method further including, with the one or more processors: identifying one or more residual echo signals amongst the first source-separated audio signals and the second source-separated audio signals; and improving acoustic echo cancellation using the residual echo signals.

In some aspects, the techniques described herein relate to a method further including, with the one or more processors, determining a direction of arrival of one or more of the first plurality of source-separated audio signals and one or more of the second plurality of source-separated audio signals based on based on time or phase delays between individual microphone elements.

In some aspects, the techniques described herein relate to a method wherein the first type is a noise source, the second type is a speech source, and the method further includes, with the one or more processors, omitting or reducing a contribution from the first source-separated signal in the output audio stream relative to content from the second source-separated signal.

In some aspects, the techniques described herein relate to a non-transitory computer readable storage medium storing instructions that, when executed by a computing system, cause the computing system to perform operations including: performing one or more blind source separation operations on at least one first audio signal generated by a first microphone of a plurality of microphones to generate a first plurality of source-separated audio signals each corresponding to a different audio source; performing one or more blind source separation operations on at least one second audio signal generated by a second microphone of the plurality of microphones to generate a second plurality of source-separated audio signals each corresponding to a different audio source; processing a first source-separated signal of the first plurality of source-separated audio signals to identify a first type of audio source corresponding to the first source-separated signal; processing a second source-separated signal of the second plurality of source-separated audio signals to identify a second type of audio source corresponding to the second source-separated signal; and generating an output audio stream for playback. The output audio stream can include audio content from one or both of the first source-separated signal and the second source-separated signal. The generating of the output stream can be based at least in part on one or more of direction of arrival information and signal strength information.

In some aspects, the techniques described herein relate to a non-transitory computer readable storage medium wherein the first and second types of audio sources are the same type.

In some aspects, the techniques described herein relate to a non-transitory computer readable storage medium wherein the first and second source-separated signals correspond to the same human speaker speech source.

In some aspects, the techniques described herein relate to a non-transitory computer readable storage medium wherein the operations further include using one or more of direction of arrival and signal strength information, determining a physical position of the human speaker, and tracking the physical position of the human speaker as the human speaker moves.

In some aspects, the techniques described herein relate to a non-transitory computer readable storage medium wherein at least one of the first and second types is a speech source, and the operations further include using a voice activity detection technique to identify the speech source.

In some aspects, the techniques described herein relate to a non-transitory computer readable storage medium wherein the operations further include using direction of arrival information relating to one or both of the first and second source-separated signals in generating the output audio stream.

In some aspects, the techniques described herein relate to a non-transitory computer readable storage medium wherein the operations further include using signal strength information relating to one or both of the first and second source-separated signals in generating the output audio stream.

In some aspects, the techniques described herein relate to a non-transitory computer readable storage medium wherein the operations further include applying a first audio signal processing operation on the first source-separated audio signal based on the identified first type, and applying a second audio signal processing operation on the second source-separated audio signal based on at least the identified second type, wherein the first and second audio processing operations are different.

In some aspects, the techniques described herein relate to a non-transitory computer readable storage medium wherein the operations further include: identifying one or more residual echo signals amongst the first source-separated audio signals and the second source-separated audio signals; and improving acoustic echo cancellation using the residual echo signals.

In some aspects, the techniques described herein relate to a non-transitory computer readable storage medium wherein the operations further include determining a direction of arrival of one or more of the first plurality of source-separated audio signals and one or more of the second plurality of source-separated audio signals based on based on time or phase delays between individual microphone elements.

In some aspects, the techniques described herein relate to a non-transitory computer readable storage medium wherein the first type is a noise source, the second type is a speech source, and the wherein the operations further include omitting or reducing a contribution from the first source-separated signal in the output audio stream relative to content from the second source-separated signal.

In some aspects, the techniques described herein relate to a conferencing system including: a plurality of microphones each configured to detect sound and to generate one or more audio signals responsive to the detected sound; and one or more processors executing an audio processing system and coupled to the plurality of microphones via a network, the audio processing system configured to: perform one or more source separation operations on the audio signals to generate a plurality of source-separated audio signals each corresponding to an audio source; process the source-separated audio signals to identify a type of each of the audio sources; and update a stored auditory scene database to indicate at least: i) the audio sources; and ii) the identified type of each of the audio sources.

In some aspects, the techniques described herein relate to a conferencing system wherein the audio processing system is further configured to update the database to indicate, for each of the audio sources, one or more detecting microphones of the plurality of microphones that detected the audio source.

In some aspects, the techniques described herein relate to a conferencing system wherein the audio processing system is configured to further process at least a subset of the source-separated audio signals to identify, for each source-separated audio signal in the subset, a sub-type of the audio source corresponding to the source-separated audio signal, and to update the database to indicate the sub-type of the audio source.

In some aspects, the techniques described herein relate to a conferencing system wherein the audio processing system is configured to further process at least a subset of the source-separated audio signals to identify, for each source-separated audio signal in the subset, a unique identity of the audio source corresponding to the source-separated audio signal, and to update the database to indicate the unique identity of the audio source In some aspects, the techniques described herein relate to a conferencing system wherein at least one of the unique identities is that of a unique human speaker.

In some aspects, the techniques described herein relate to a conferencing system wherein the audio processing system is configured to further process at least a subset of the source-separated audio signals to identify, for each source-separated audio signal in the subset, a physical position of the audio source corresponding to the source-separated audio signal, and to update the database to indicate the position of the audio source.

In some aspects, the techniques described herein relate to a conferencing system wherein the audio processing system is configured to update the database to indicate, for each of the plurality of microphones, which of the audio sources are detected by the microphone.

In some aspects, the techniques described herein relate to a conferencing method including: with one or more processors operatively coupled to a plurality of microphones positioned in a conferencing environment: performing one or more source separation operations on one or more audio signals generated by the microphones to generate a plurality of source-separated audio signals each corresponding to an audio source; processing the source-separated audio signals to identify a type of each of the audio sources; and updating a stored auditory scene database to indicate at least: i) the audio sources; and ii) the identified type of each of the audio sources.

In some aspects, the techniques described herein relate to a method further including updating the database to indicate, for each of the audio sources, one or more detecting microphones of the plurality of microphones that detected the audio source.

In some aspects, the techniques described herein relate to a method further including further processing at least a subset of the source-separated audio signals to identify, for each source-separated audio signal in the subset, a sub-type of the audio source corresponding to the source-separated audio signal, and to update the database to indicate the sub-type of the audio source.

In some aspects, the techniques described herein relate to a method further including further processing at least a subset of the source-separated audio signals to identify, for each source-separated audio signal in the subset, a unique identity of the audio source corresponding to the source-separated audio signal, and to update the database to indicate the unique identity of the audio source In some aspects, the techniques described herein relate to a method wherein at least one of the unique identities is that of a unique human speaker.

In some aspects, the techniques described herein relate to a method further including further processing at least a subset of the source-separated audio signals to identify, for each source-separated audio signal in the subset, a physical position of the audio source corresponding to the source-separated audio signal, and to update the database to indicate the position of the audio source.

In some aspects, the techniques described herein relate to a method further including updating the database to indicate, for each of the plurality of microphones, which of the audio sources are detected by the microphone.

In some aspects, the techniques described herein relate to a non-transitory computer readable storage medium storing instructions that, when executed by a computing system, cause the computing system to perform operations including: performing one or more source separation operations on one or more audio signals generated by a plurality of microphones to generate a plurality of source-separated audio signals each corresponding to an audio source; processing the source-separated audio signals to identify a type of each of the audio sources; and updating a stored auditory scene database to indicate at least: i) the audio sources; and ii) the identified type of each of the audio sources.

In some aspects, the techniques described herein relate to a non-transitory computer readable storage medium wherein the operations further include updating the database to indicate, for each of the audio sources, one or more detecting microphones of the plurality of microphones that detected the audio source.

In some aspects, the techniques described herein relate to a non-transitory computer readable storage medium wherein the operations further include further processing at least a subset of the source-separated audio signals to identify, for each source-separated audio signal in the subset, a sub-type of the audio source corresponding to the source-separated audio signal, and to update the database to indicate the sub-type of the audio source.

In some aspects, the techniques described herein relate to a non-transitory computer readable storage medium wherein the operations further include further processing at least a subset of the source-separated audio signals to identify, for each source-separated audio signal in the subset, a unique identity of the audio source corresponding to the source-separated audio signal, and to update the database to indicate the unique identity of the audio source In some aspects, the techniques described herein relate to a non-transitory computer readable storage medium wherein at least one of the unique identities is that of a unique human speaker.

In some aspects, the techniques described herein relate to a non-transitory computer readable storage medium wherein the operations further include further processing at least a subset of the source-separated audio signals to identify, for each source-separated audio signal in the subset, a physical position of the audio source corresponding to the source-separated audio signal, and to update the database to indicate the position of the audio source.

In some aspects, the techniques described herein relate to a non-transitory computer readable storage medium wherein the operations further include updating the database to indicate, for each of the plurality of microphones, which of the audio sources are detected by the microphone.

BRIEF DESCRIPTION OF THE DRAWINGS

FIGS. 4A-4C show examples of data generated and maintained by an audio processing system, according to certain embodiments.

DETAILED DESCRIPTION

Figure 1:
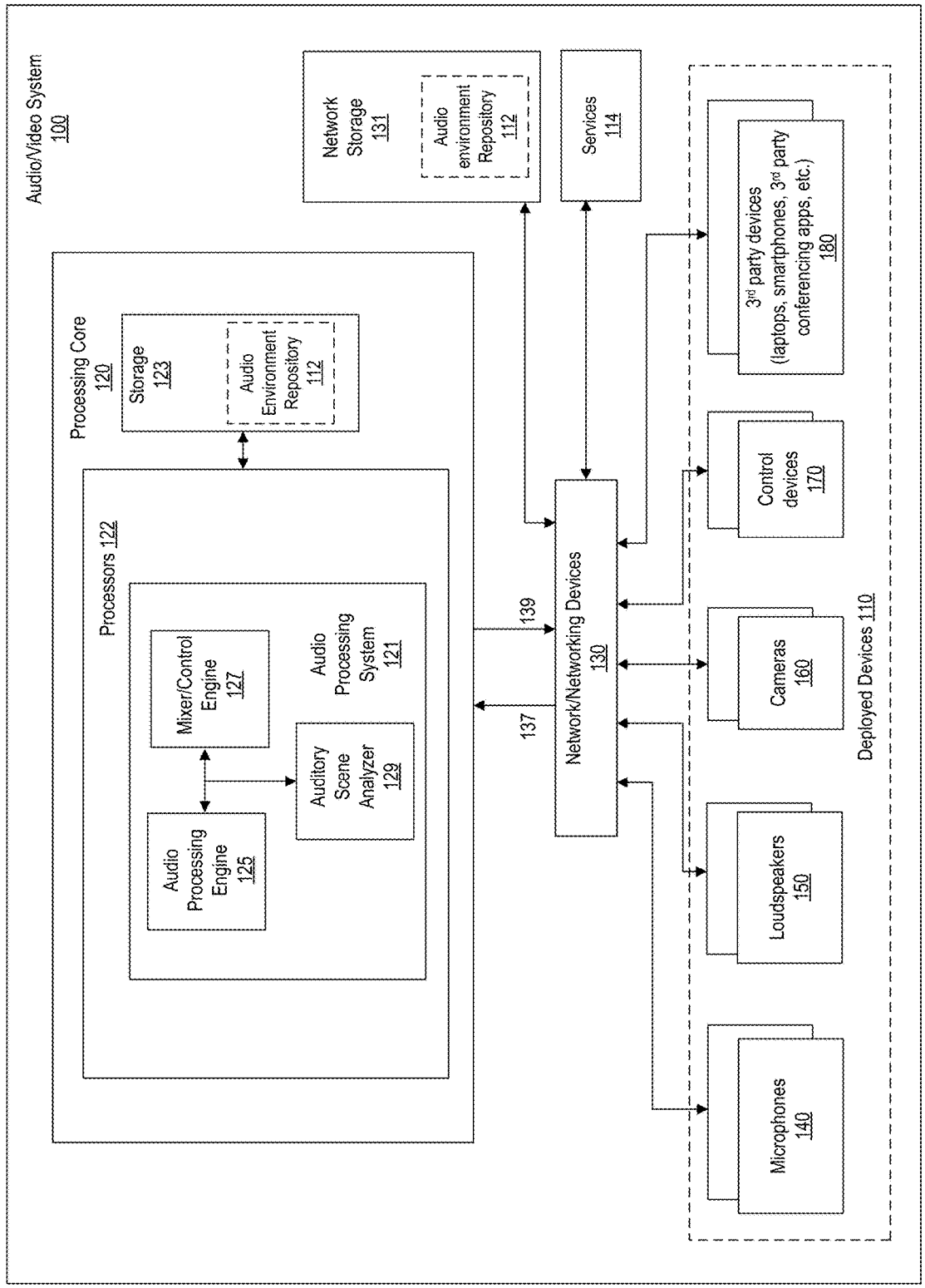
FIG. 1 illustrates an audio/video system according to certain embodiments.

For purposes of summarizing the disclosure, certain aspects, advantages, and novel features of the disclosures have been described herein. It is to be understood that not necessarily all such advantages can be achieved in accordance with any particular embodiment of the disclosures disclosed herein. Thus, the systems and methods disclosed herein can be embodied or carried out in a manner that achieves or optimizes one advantage or group of advantages as taught herein without necessarily achieving other advantages as can be taught or suggested herein.

Described herein are systems and corresponding methods for separating and classifying sources of audio captured by one or more microphone arrays or other types of microphones. The systems can be deployed in various environments including teleconference meeting rooms, lecture halls, or other collaboration spaces. The systems can identify speech and separate sound sources including by separating speech from noise sources or other audio sources.

To separate desired speech from unwanted noises or sources, some systems rely on adaptive beamforming or techniques that rely primarily on sound source directionality. Some systems may filter noises by comparing detected energy level to expected speech level. However, unwanted noise can be of similar loudness to, or louder than, desired speech, measured at a microphone. In such cases, it can be difficult to differentiate sound sources, particularly those coming from the same direction at similar energy or frequency levels, and noises can pass to a network communication channel for playback in an output stream.

Because of the above limitations, it is a challenge for some microphone systems to identify and separate sound sources (e.g., speech and non-speech point sources, diffuse sources, etc.), particularly in fluid environments, such as meeting rooms, lecture halls, and collaboration spaces. Some challenges addressed by systems described herein can include: 1) poor room acoustics; 2) multiple simultaneous talkers (could be in near field or distant field); 3) diverse sound sources including noise types (e.g., papers shuffling, footsteps, talkers in adjacent rooms, HVAC systems, etc.); and 4) point or diffuse noises.

Certain embodiments described herein do not rely on, or do not rely primarily or solely on, detected directionality or energy level, and can employ blind source separation, for example, along with other techniques to identify and separate sound sources. Other embodiments can rely on directionality or energy level in combination with blind source separation.

Moreover, source separation-based processing techniques described herein can allow for incorporation of microphone-arrays with various geometries, without being limited to rigid pre-defined geometries, and can allow for flexibility in microphone placement and installation, as compared to some existing systems that require prescribed placement, such as to avoid overlap or interference between microphones. The systems can additionally achieve improved user experience with voice control and commands, and talker-specific improved personalization of audio settings.

Audio Processing System Overview

Audio processing systems include sophisticated computer-controlled equipment that receive and distribute sound in a space. Such equipment can be used in business establishments, bars, restaurants, conference rooms, concert halls, churches, or any other environment where it is desired to receive audio inputs from a source and deliver it to one or more loudspeakers for people to hear. Some modern systems incorporate integrated audio, video, and control (AV&C) capability to provide an integrated system architecture. An example of such a system is the QSC® Q-SYS™ Ecosystem provided by QSC, LLC, which provides a scalable software-based platform. A simplified representation of an audio/video system 100 is shown and described with respect to FIG. 1.

The illustrated example system 100 includes a set of deployed devices 110, a processing core 120 that can include one or more processors 122 and storage/memory 123, a network 130 comprising networking devices and that connects the processing core 120 to the deployed devices 110, one or more network storage devices 131, and one or more services 114. Data can be communicated to and from the processing core 120 via first and second network channels 137, 139, which can each comprise one or more logical data streams.

The network storage 131 can be cloud storage connected to the processing core 120 and/or deployed devices 110 via the Internet or another wide or local area network. An audio environment repository 112 can reside on the one or more storage devices 123 local to the processing core 120 and/or on the network storage 131, and can maintain a variety of information about the audio environment in which the system 100 is deployed, as will be discussed in more detail herein.

The services 114 can be in communication with the processing core 120 and/or deployed devices 110 via the Internet or another wide or local area network, and can include audio processing services such as cloud/edge voice command processing services, transcription services, or artificial intelligence processing.

The deployed devices 110 can include one or more microphone arrays 140 or other microphones, loudspeakers 150, cameras 160, control devices 170, and third party devices 180.

The processor(s) 122 of the illustrated embodiment can include one or more general purpose microprocessors, although alternative configurations can include an audio processing engine custom-designed for audio digital signal processing, which can be a custom-designed application-specific integrated circuit. As shown, an audio processing system 121 can comprise an audio processing engine 125, a mixer/control engine 127, and an auditory scene analyzer 129, which can execute on the processors 122. While the operations described herein are in some cases described for the purposes of illustration as being performed by the audio processing engine 125, mixer/control engine 127, and auditory scene analyzer 129 residing on the processing core 120 of the system 100, in other embodiments, one or more of the operations including, some or all of echo cancelation, blind source separation or other digital signal processing operations, can be performed on-board each individual microphone system 140 on signals detected by that microphone system 140, rather than in the processing core 120.

The microphone systems 140 can include one or more array microphones including multiple individual microphone elements arranged in an array, although other types of microphone systems can also be included. Examples of compatible microphones systems are described herein at with respect to FIGS. 8 and 9. The cameras 160 can include one or more digital video cameras, which can point in a fixed direction or have movable pointing, e.g., via a motorized gimbal. The control devices 170 can include any appropriate user input devices such as a touch screen, computer terminal or the like. While not shown in FIG. 1, the system 100 can also include appropriate supporting componentry, such as one or more audio amplifiers or video bridge devices.

The loudspeakers 150 can be standalone speakers, or speakers integrated within displays, networked telephones, or the like.

The third party devices 180 can include one or more laptops, desktops or other computers, smartphones or other mobile devices, projectors, screens, lights, curtains/shades, fans, and third party applications that can execute on such devices, including third party conferencing applications such as Zoom or Microsoft® Teams or digital voice assistants like Apple's Siri®.

While illustrated as separate components in FIG. 1, depending on the implementation, microphone systems 140, loudspeakers 150, cameras 160, control devices 170, and/or third party devices 180 can be integrated together. For example, some or all of a microphone array, loudspeaker, camera, and touch screen can be integrated into a common packaging.

In operation, the microphone(s) 140 detect sounds in the environment, convert the sounds to digital audio signals, and stream the audio signals to the processing core 120 over the network 130. The audio processing system 121 can receive the audio signals and performs digital signal processing and/or other processing on the signals. For example, the audio processing engine 125 can perform any combination of fixed or adaptive echo cancellation, blind source separation to separate audio emanating from different sources in the environment, and other digital signal processing including amplification, other types of noise processing, spatial filtering, or other audio processing. The processor 122 can perform additional post-processing, which can include artificial intelligence (AI), machine learning (ML), and other operations. More details regarding these and other operations are described herein, including with respect to FIGS. 2-7. In some embodiments, instead of the microphone 140 sending raw digital audio signals to the processing core 120, one or more processors on the microphone system 140 itself perform some or all of the echo cancellation amplification, blind source separation, or other digital signal processing prior to sending the signal to the processing core 120.

The mixer/control engine 127 can be configured to mix together the audio streams separated, classified, and otherwise processed by the audio processing engine 125 to construct output streams for playback by the system 100. For instance, the mixer/control engine 127 can provide audio/video data output streams via the second network channel 139 for playback by the loudspeakers 150, third party devices 180, or other deployed devices 110 in the system 100. The mixer/control engine 127 can also be configured adjust the operation of one or more devices in the system 100. For example, the mixer/control engine 127 can be configured to issue commands to control or affect operation of any of the microphones 140, loudspeakers 150, cameras 160, control devices 170, the third party devices 180, or other deployed devices 110.

As will be described in greater detail herein, the auditory scene analyzer 129 can be configured to process data to generate and maintain a representation of the auditory "scene" of the environment in which the system 100 is deployed. The input data can include, without limitation, data detected by the system 100 (e.g., by the microphones 140, cameras 160, or other deployed devices 110), data generated by the system 100 (e.g., data generated by the audio processing system 121 or components thereof), data previously provided to the system 100 (e.g., information relating to the deployed environment such as digital maps or blueprints, lists of or information relating to the deployed devices 110, etc.), and data maintained in the environment repository 112.

The first network channel 137 communicates data from the deployed devices 110 to the processing core 120. For instance, the first network channel 137 can transmit to the processing core 120, without limitation: streams of raw or processed audio data from the microphones 140; streams of raw or processed video data captured by the cameras 160; touch screen or other user interface input data or other control data from the control devices 170; and video and audio data streams from the party devices 180. Where the cameras 160 include integrated microphones, the processing core 120 can receive audio data from the cameras 160 over the first network channel 137 in addition to video data.

The second network channel 139 can communicate data from the processing core 120 to the deployed devices 110. For example, as indicated previously, the second network channel 139 can transmit command information for controlling the deployed devices 110 and/or audio and video content for playback by the deployed devices 110. With respect to audio and video content, the second network channel 139 can transmit to the deployed devices 110, without limitation: audio data streams for playback by one or more of the loudspeakers 150, e.g., after processing by the audio processing engine 125 and mixing by the mixer/control engine 127, video data streams for playback by the cameras 160; and video and/or audio data streams for playback by one or more of the 3$^{rd}$ party devices 180, e.g., after processing by the audio processing engine 125 and the mixer/control engine 127. With respect to command information, the second network channel 139 can transmit to the deployed devices 110, without limitation: commands to the microphones 140 to adjust the sensitivity, directionality, or other operation of one or more of the microphones 140; commands to the loudspeakers 150 to adjust the volume or other audio output characteristic of one or more of the loudspeakers 150; commands to physically adjust the pointing direction of one or more of the loudspeakers 150; commands to adjust the exposure, focus, zoom, frame rate, resolution, or other operation of one or more of the cameras 160; commands to adjust the pointing direction of one or more of the cameras 160 via physical movement or digital adjustment via electronic pan, tilt, zoom (EPTZ); commands to update user interfaces of the control devices 170, third party devices 180, or other deployed devices 110, including to update graphical user interfaces displays or to output digitally generated voice or other audio (e.g., "Meeting started" from a virtual meeting host); and commands to activate or deactivate any of the microphones 140, loudspeakers 150, cameras 160, control devices 170, or other deployed devices 110.

Identifying and Separating Sound Sources in Meeting Room/Conferencing Environments According to certain embodiments, the audio system 100 is configured to differentiate different sources of sound content in the audio environment. As one example, it can be helpful in a conference room setting to differentiate a primary person speaking from a noise source such as a fan and/or other talkers. In such a case, the audio system 100 can process sound detected by one or more of the microphones 140 to emphasize the primary speaker's voice, such as by filtering out sound generated by other sound sources, or amplifying or otherwise emphasizing the primary speaker's voice in relation to other sound sources.

Figures 2A, 2B:
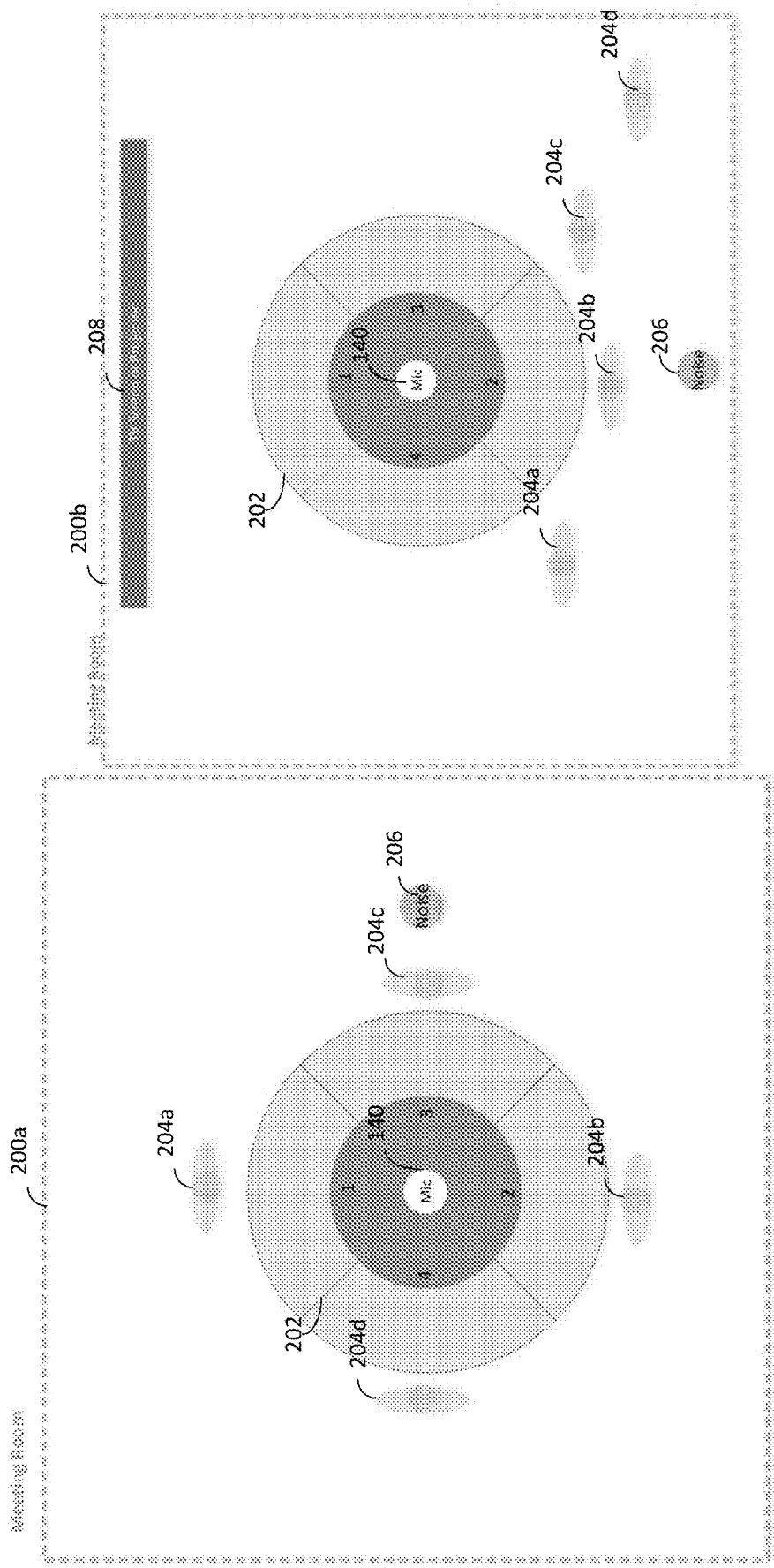
FIGS. 2A-2B illustrate meeting rooms in which an array microphone of an audio system is situated.

FIG. 2A shows an example of a meeting room environment 200a including a conference table 202 with a microphone 140 mounted or otherwise placed at the center of a table 202. The microphone 140 can be connected to the processing core 120, e.g., via an Ethernet cable connection (not shown) or wirelessly to the network 130. The sound environment around the microphone 140 is divided into four quadrants, each corresponding to a different zone 1-4, with one of the four people 202a-d each positioned within one of the zones 1-4. A noise source 206, which can be any noise source such as a fan, television, or speech from another talker, is positioned behind the person 204c in zone 3. According to certain embodiments, the system 100 can employ any of the sound source separation techniques described herein, including any of those incorporating blind source separation, to differentiate the various audio sources in the environment 200a. For example, according to certain embodiments, the one or more processors 122 applies a blind source separation algorithm in combination with one or more other processing techniques to audio detected by the microphone 140 to identify and separate the sound sources 202a-d, 206 in the environment. In some embodiments, the microphone system 140 is an array microphone including a plurality of microphone elements, and the processing core 120 applies a blind source separation algorithm on the detected sound to differentiate sound content on a source-by-source basis, separating the sound content into five separate signal streams corresponding to the four speakers 204a-d and the noise source 206. The processing core 120 can then apply additional processing to the separated signals, such as by outputting or amplifying the level of the speech content in the output stream, and filtering out or reducing the level of the noise content in the output stream. As will be explained in greater detail, such as with respect to FIGS. 3-7, a number of different additional processing operations can be combined with blind source separation, including acoustic echo cancellation, audio source classification, artificial intelligence, etc.

FIG. 2B shows a meeting room 200b in a scenario where the four people 204a-d are generally seated or standing behind the table 202, watching a display 208 such as a TV screen or projector, and where a noise source 206 is situated behind the people 202a-d. According to certain embodiments, the system 100 can employ any of the sound source separation techniques described herein, including any of those incorporating blind source separation, to differentiate the various audio sources in the scenario shown in FIG. 2B. For example, the processing core 120 can apply blind source separation in combination with one or more other processing to techniques to separate the signal detected by the microphone 140 into up to six separate signals corresponding to speech from the four people 202a-d, sound from the noise source 206, and sound coming from the display 208. In this case, blind source separation would allow the system 100 to differentiate speech coming from the two people 204c, 204d even though the person 204c is between the person 204d and the microphone 140. Blind source separation also allows the system 100 to differentiate sound coming from the person 204b from sound coming from the noise source 206, even though the person 204b is between the noise source 206 and the microphone 140, and even if the speech coming from the person 204b and from the noise source 206 have similar energy or frequency levels.

Figure 2C:
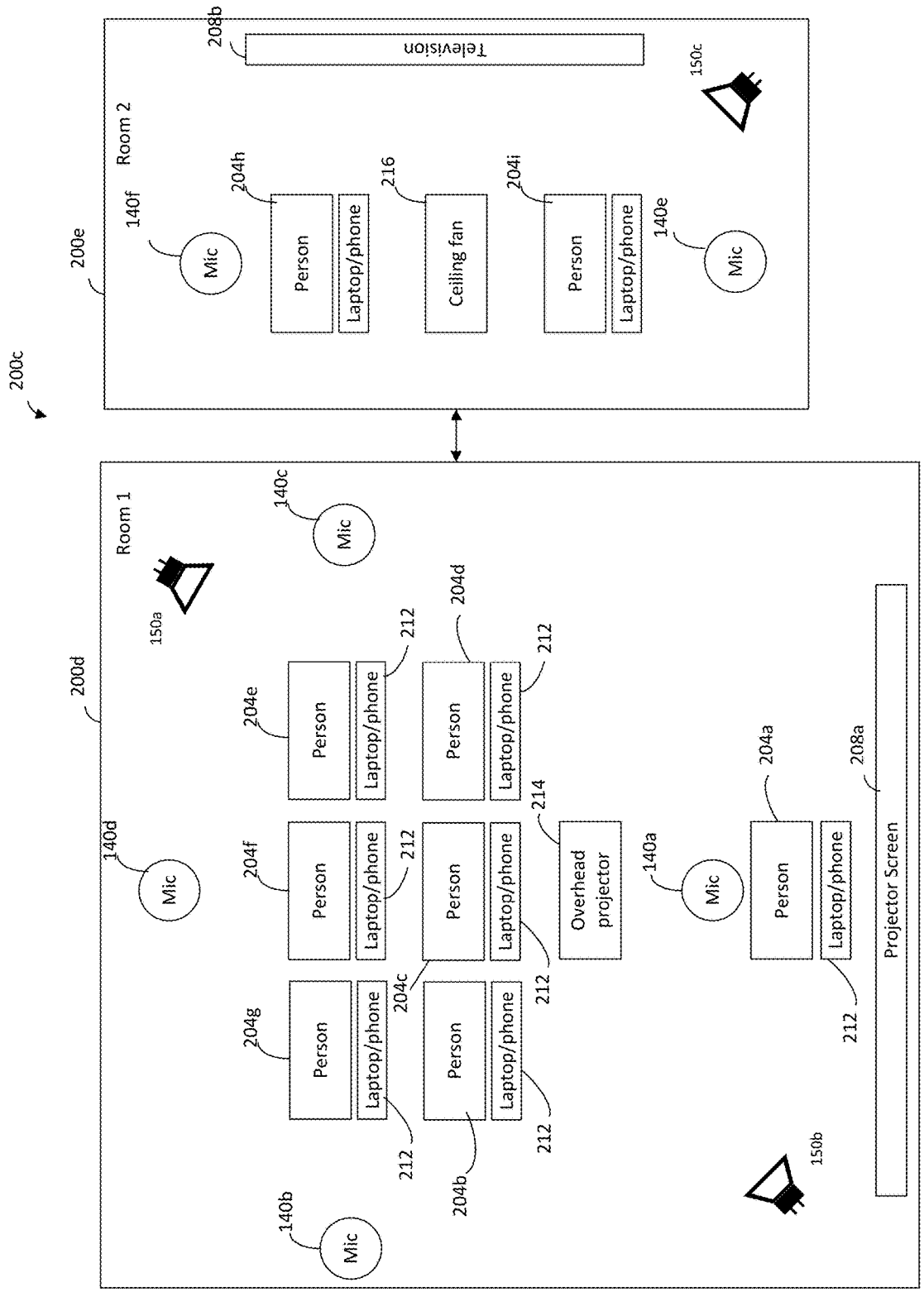
FIG. 2C illustrates a multi-room conferencing environment where microphones of an audio system are deployed with respect to various sound sources.

FIG. 2C illustrates another example of an environment 200c in which an audio system 100 is deployed. The environment 200c includes a first room 200d networked together in an audio/video conference with a second room 200e. The system 100 includes four microphones 140a-d positioned throughout the first room 200d, two microphones 140e-f positioned in the second room 200e, displays 208a-b in each room to facilitate video conferencing, and loudspeakers 150a-150c in each room 200d, 200e, which may be separately housed and/or integrated together with the microphones 140 or displays 208a-b. The microphones 140a-f, displays 208a-b, loudspeakers 150a-150c, projector 214, and one or more of the user devices 212 can be connected via wired or wireless connection to the network 130 and processing core 120.

The environment 200d includes nine people 204a-204i, including a first person 208a in the first room 200d delivering a presentation to six other people 204b-g situated in the first room 200d. The presenter's 204a voice is detected by one or more of the microphones 140a-140d in the first room 200d, processed according to any of the techniques described herein, and broadcast by the system 100 via one or more of the loudspeakers 150a-150c in the first and second rooms 200d, 200e. As shown, each person can have a phone, laptop, and/or other additional sound source 212 in their proximity, which can output speech and/or non-speech sound. The environment 200c further includes additional non-speech sources, such as a fan of the overhead projector 214 mounted in the first room 200d, which projects onto the screen 208a, and a ceiling fan 216 mounted in the second room 200e. Other types of noise sources can also be present, such as one or more loudspeakers playing ambient music, not be connected to the audio system 100. The rooms 200d, 200e can further include one or more cameras (not shown) that record a video stream, and which the system 100 processes for real-time transmission over the network 130 and live play-back on the displays 200a-b.

According to certain embodiments, the system 100 can employ any of the sound source separation techniques described herein, including any of those incorporating blind source separation, to differentiate the various audio sources in the environment 200c. For example, according to certain embodiments, the system 100 can use blind source separation in combination with one or more other processing techniques to process signals detected by each individual microphone 104a-f to generate separate signals/data streams for each source. As an example, the system 100 can process sound detected by the microphone 140a at the front of the room 200d into constituent signals corresponding to at least the following sources: 1) speech from the person 204a; 2) speech (e.g., speaker phone call) or non-speech (e.g., ring chime) sound generated by the person's 204a phone or laptop 212; 3) sound generated by a fan in the overhead projector 214; 4) speech or non-speech sound generated by one or more of the other people 204b-g in the first room 200d; and 5) speech or non-speech sound generated by the laptops or phones 212 associated with the other people 204b-g in the first room 200d. The system 100 can similarly differentiate sound detected by each of the other microphones 140b-d in the first room 200d into separate constituent signals corresponding to each of the various sound sources in the room detected by the respective microphone 140. Similarly, in the second room 200e, the system 100 can separate sound detected by each of the two microphones 140f-e into constituent signals corresponding to at least the following sources in the second room 200e: 1) speech or non-speech sound from the two people 204h-i; 2) speech or non-speech sound generated by the laptops or phones 212; and 3) sound generated by the ceiling fan 216.

In some embodiments, the system 100 performs sound source separation on sound detected by a given microphone 140 using not only signals corresponding to sound detected by that microphone 140, but also signals corresponding to sound detected by one or more of the other microphones 140. For instance, the system 100 can implement any of the operations described with respect to FIGS. 2A-2C using any of the components or methods described herein, including with respect to FIGS. 3A-7, such as the audio processing systems 121 described with respect to FIGS. 1 and 3A-3G, for example.

Audio Processing Using Blind Source Separation

Figure 3A:
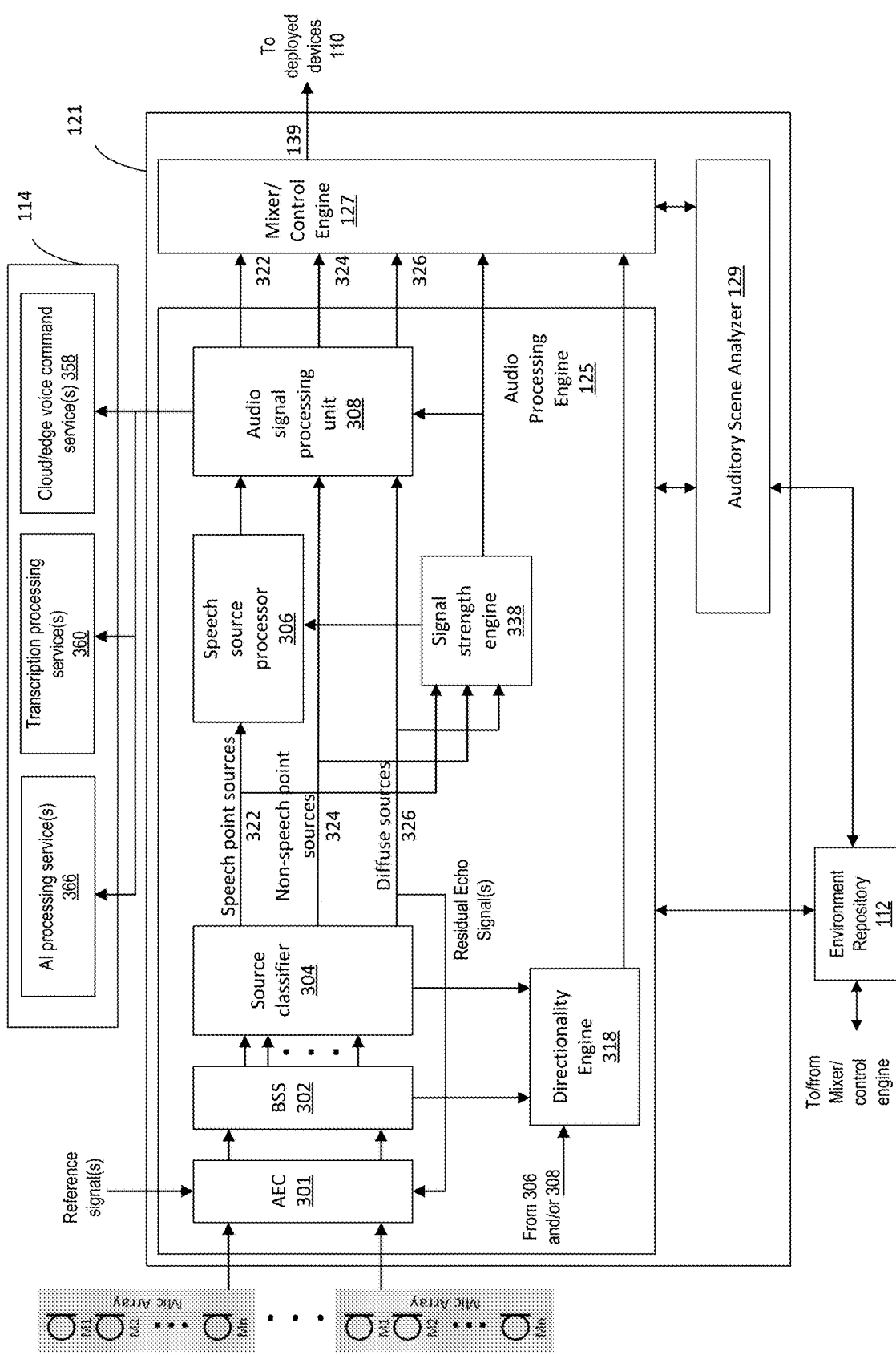
FIG. 3A illustrates an example of an audio processing engine configured to separate sound sources and process the separated sources, according to certain embodiments.

FIG. 3A shows an example of an audio processing system 121. The audio processing engine 125 may be implemented as software or firmware on the microprocessors(s) 122 of the processing core 100 in the audio/video system 100. The illustrated audio processing engine 125 is connected to one or more microphone arrays 140 each having a number of individual microphone elements M1-Mn, and which can be any combination of the microphones described herein, depending on the embodiment. The system 100 can be connected to some or all of the microphones 140 shown in the rooms 200a, 200b, 200d, 200e illustrated in FIG. 2A, 2B, or 2C, for example.

The audio processing engine 125 includes some or all of a number of illustrated audio source processing stages, including an echo canceller 301, a blind source separator 302 configured to detect and extract sound sources detected by the microphone array(s) 140, a source classifier 304 configured to classify the extracted sound sources, a speech source processor 306 configured to scan, select, map, and otherwise process content from speech sound sources, and an audio signal processing unit 308 configured to perform digital signal processing or other audio processing on the sources, which can be customized, optimized, and/or personalized based on a source-by-source basis.

Depending on the embodiment, an acoustic echo canceller (AEC) 301 may be included. The illustrated AEC 301 is connected between the microphone arrays 140 and the BSS 302, and performs fixed or adaptive acoustic echo cancellation on the signals output by the microphone array(s) 140 to reduce echoes and/or reverberation, and to generate one or more echo cancelled signals. For instance, the AEC 301 can apply linear AEC on each of the microphone elements of the array(s) 140, by processing the detected input signals, one or more reference signal(s) (e.g., far end signals), and/or one or more residual echo signal(s). For example, referring to FIG. 2C, echoes can occur when sound generated in the first room 200d (far end) is detected by one or more microphones 140a-d in the first room 200d, played on a loudspeaker in the second room 200e (near end), detected by one or more of the microphones 140e-f in the second room 200e (near end), and played back as echo by loudspeakers in the first room 200d (far end). The AEC 301 can process far end signals detected by microphones in the first room 200d, near end signals detected by the microphones 140e-f in the second room 200e, and any residual echo detected by the audio processing engine 125, to reduce or prevent such echoing from being output in the first room 200d (far end).

While the illustrated embodiment does not include a beamformer, in some other embodiments a beamformer can optionally be included, and in such cases, it can be positioned the microphone array(s) 140 and the AEC 301. The beamformer can combine received signals from the elements in M1-Mn in each array 140 using different weights, such that signals at particular angles experience constructive interference, while others experience destructive interference. The beamformer can be a fixed beamformer that points the beam(s) at fixed directions using fixed weights, or an adaptive beamformer, where the weights can adapt to change the direction of the beam(s). While the beamformer can be positioned before the AEC 301, in other implementations the order can be reversed.

Source Separation

Figure 3B:
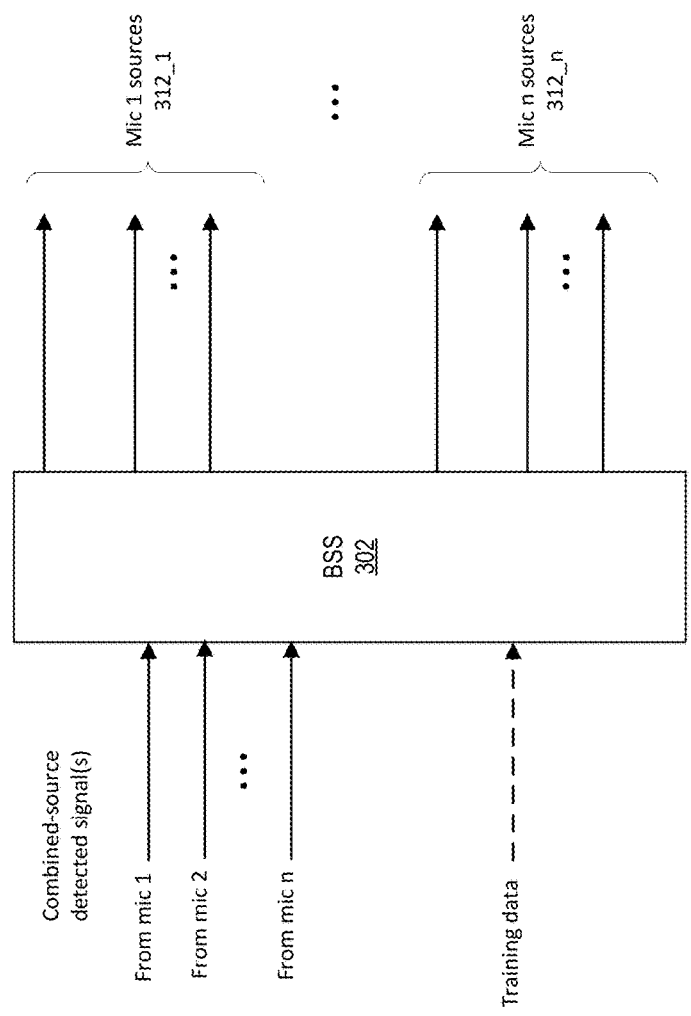
FIGS. 3B-3G illustrate detailed views of portions of the audio processing system of FIG. 3A, according to certain embodiments.

As shown in FIG. 3B, the BSS 302 can be configured to separate the echo cancelled signals from microphones 140 1-$n$ into groups of output signals 312 including a first signal group 312_1 corresponding to the separated sources detected by a first microphone array 140 through an nth signal group 312_$n$ corresponding to the separated sources detected by the nth microphone array 140 in the system 100. The sources 312 can include, without limitation: speech and non-speech point sources (e.g., voices, video projector fans, etc.) as well as diffuse sources (e.g., residual echo, reverberations, etc.). Where the audio processing engine 125 includes an AEC 301, the BSS 302 can the receive and separate echo cancelled microphone signals output from the AEC 301. In the illustrated embodiment, the number of separated sources for a given microphone 140 depends on how many sources are picked up by that microphone 140. While the BSS 302 shown in FIG. 3B extracts sources on a microphone 140 by microphone 140 basis, in some embodiments, the BSS 302 can separate sources more granularly, such as by separating distinct or individual sources detected by each of the individual microphone elements M1-Mn within a microphone array 140.

In some embodiments, the BSS 302 uses independent component analysis (ICA) to separate the signal into multiple, statistically independent, subcomponents. For example, the BSS 302 can decompose the mixed component input signal(s) and extract independent signals, and those independent signals with non-Gaussian histograms or low complexity can be determined to be source components. U.S. Patent Application Publication No. 2009/0150146, titled Microphone Array Based Speech Recognition System and Target Speech Extracting Method of the System, published Aug. 12, 2012, describes certain examples of independent component analysis, and is incorporated by reference herein in its entirety. According to some embodiments, the BSS 302 can comprise a fully-convolutional time-domain audio separation network, which implements a deep learning framework for end-to-end time-domain speech separation. In such cases, the BSS 302 can use a linear encoder to generate a representation of waveforms optimized for separating individual speakers (or other sound sources). Separation can be achieved by applying a set of weighting functions (e.g., masks) to the encoder output. The modified encoder representations can be inverted back to the waveforms using a linear decoder. The masks can be found using a temporal convolutional network (TCN) consisting of stacked 1-D dilated convolutional blocks, which allows the network to model the long-term dependencies of the speech signal while maintaining a small model size. Examples of such techniques are shown and described in Conv-TasNet: Surpassing Ideal Time-Frequency Masking for Speech Separation, Yi Luo, Nima Mesgarani, May 15 2019, the contents of which are incorporated by reference herein.

The audio processing system 121 can additionally process the detected audio content to determine one or more of inter- or intra-microphone 140 level differences, inter- or intra-microphone 140 time differences, inter- or intra-microphone 140 phase differences, or detected pitch, and the BSS 302 can use some or all of this information to assist in refining or validating the source separation.

The BSS 302 can optionally implement machine learning or other artificial intelligence, and can adaptively train and tune to the artificial intelligence algorithm to the particular deployed environment in response to training data. The BSS 302 can apply any appropriate artificial intelligence algorithm, including those based on DNN, machine learning, or the like to tune or adapt to the particular environment. For instance, the BSS 302 can implement a convolutional time-domain audio separation network including a deep machine learning framework, such as Conv-TasNet, or a multi-scale neural network operating in the time domain, such as Wave-U-Net. The training data can include publicly available corpuses of recorded spoken word (e.g., LibriSpeech, which includes ~1000 hours of 16 kHz spoken English) and/or curated noise samples (e.g., FSD50K, which includes a data set of human labeled sound events). The BSS 302 can alternatively or additionally train on data detected by the audio processing system 121, which can be detected and used as training data on the fly, or stored and accessed at a later time, to train, retrain, or fine tune the neural network or other machine learning or AI model.

While the blind source separator 302 in the illustrated embodiment is positioned after the AEC 301, in other embodiments the blind source separator 302 is positioned before the AEC 301.

Classifying Sources

The source classifier 304 receives the source signals separated by the BSS 302, and is configured to classify or otherwise differentiate or categorize the sources. For example, referring to FIG. 3C, the source classifier 304 can classify the separated sources 312_1-312_$n$ for each of the microphones 140 1-$n$ into different groupings or types of sources. For example, in the illustrated embodiment the source classifier 304 classifies the separated sources 312_1-312_$n$ into speech point sources 322 (e.g., individual talkers in a room or other environment, loudspeakers outputting speech content), non-speech point sources 324 (e.g., dogs barking, rattling air conditioning vent), and diffuse sources 326 (e.g., diffuse fan or air conditioner background noise, reverberations, residual echo). While certain groupings of separated sources are illustrated, the sources can be categorized/organized in a variety of alternative ways depending on the implementation.

The illustrated source classifier 304 includes a diffuse/point source detector 321, a voice activity detector 320, which can be an artificial intelligence VAD (AI VAD), a speech source classifier 327, a diffuse source classifier 329, a non-speech source classifier 331, and an event activity detector (EAD) 325, which can be an artificial intelligence EAD (AI EAD).

The diffuse/point source detector 321 is configured to process groups of separated source signals 312_1-312_$n$ and detect which of the sources are point sources and which are diffuse sources. In some embodiments, the diffuse/point source detector 321 determines that if the same source is detected with similar amplitudes across multiple microphones 140, that source is a diffuse source, or is more likely to be a diffuse source. On the other hand, if a source is detected with significantly different amplitudes across multiple microphones 140, the diffuse/point source detector 321 can identify that source as a point source, or as more likely to be a point source. A variety of other algorithms or factors can be used for determining point versus diffuse sources, depending on the embodiment.

The VAD 320 can be configured to process the detected point sources and determine which are speech sources and which are not speech sources. For example, in certain embodiments the VAD 320: 1) applies noise reduction, such as via spectral subtraction, 2) identifies features on the input signal on a section-by-section or frame-by-frame basis, and 3) applies a classification rule to each section to identify the speech or non-speech content, such as when a value exceeds a threshold.

The speech classifier 327 can be configured to further classify the speech sources into more granular classifications according to some embodiments (e.g., male voice vs. female voice, adult vs. child voice, intelligible speech versus unintelligible voice sounds such as a baby crying). In some embodiments, the speech classifier 327 can perform the classification in whole or in part by analyzing the detected speech source audio content and comparing it to known speech audio samples, or to known characteristics of certain types of voices (e.g., to known pitch, tone, or frequency values or ranges of values of male, female, or child voices).

The diffuse source classifier 329 can be configured to process the diffuse source signals provided by the diffuse/point source detector 321 and classify each of the diffuse sources into different types or categories (e.g., residual echo, reverberation, etc.). In some embodiments, the diffuse source classifier 329 can perform the classification in whole or in part by analyzing the detected diffuse source audio content and comparing it to known audio samples of various diffuse sources, or to known characteristics certain types of diffuse sources (e.g., to pitch, tone, or frequency of different diffuse sources).

The non-speech classifier 331 can be configured to process the non-speech point sources provided by the VAD 320 and classify the non-speech point sources into different types or categories (e.g., typing, paper crumpling, music, dog barking, etc.). In some embodiments, the non-speech source classifier 331 can perform the classification in whole or in part by analyzing the detected diffuse source audio content and comparing it to known audio samples of various non-speech point sources, or to known characteristics certain types of non-speech point sources (e.g., to pitch, tone, or frequency of different non-speech point sources). For example, the non-speech classifier 331 can consult a database of known non-speech data samples and compare the samples to the detected non-speech point source content. The non-speech source classifier 331 outputs the categorized non-speech sources as a group of classified non-speech sources 324.

The event activity detector (EAD) 325 can be configured to process the non-speech sources provided by the non-speech classifier 331 and detect one or more "events," which can be specific audio triggers or sound signatures. The system 100 can then take actions or cause actions to be taken based on the detected events. As one example, the EAD 325 may detect a sound of window glass breaking, which could trigger the mixer/control engine 127 into initiating a networked telephone to make an automatic call to law enforcement, or to cause some other type of alert or action. As another example, the EAD 325 may detect when sound from an audio source exceeds a relative volume threshold, so as to dramatically alter the acoustic environment, such as where a landscaper turns on a leaf blower or lawn mower outside of a window. The mixer/control engine 127 can respond by commanding one or more of the loudspeakers 150 to increase in volume, or by issuing commands to the microphones 140 to adjust sensitivity. As another example, the EAD 325 may detect a cough, and implement machine learning or other AI to analyze the cough, such as to detect a specific type of ailment. The EAD 325 in some embodiments detects the sound of a door opening, and in response the mixer/control engine 127 commands a deployed device 110 to take one or more actions to begin a meeting (e.g., to start recording audio/video, to start displaying video and capturing/reproducing video or audio, etc.).

Figure 3C:
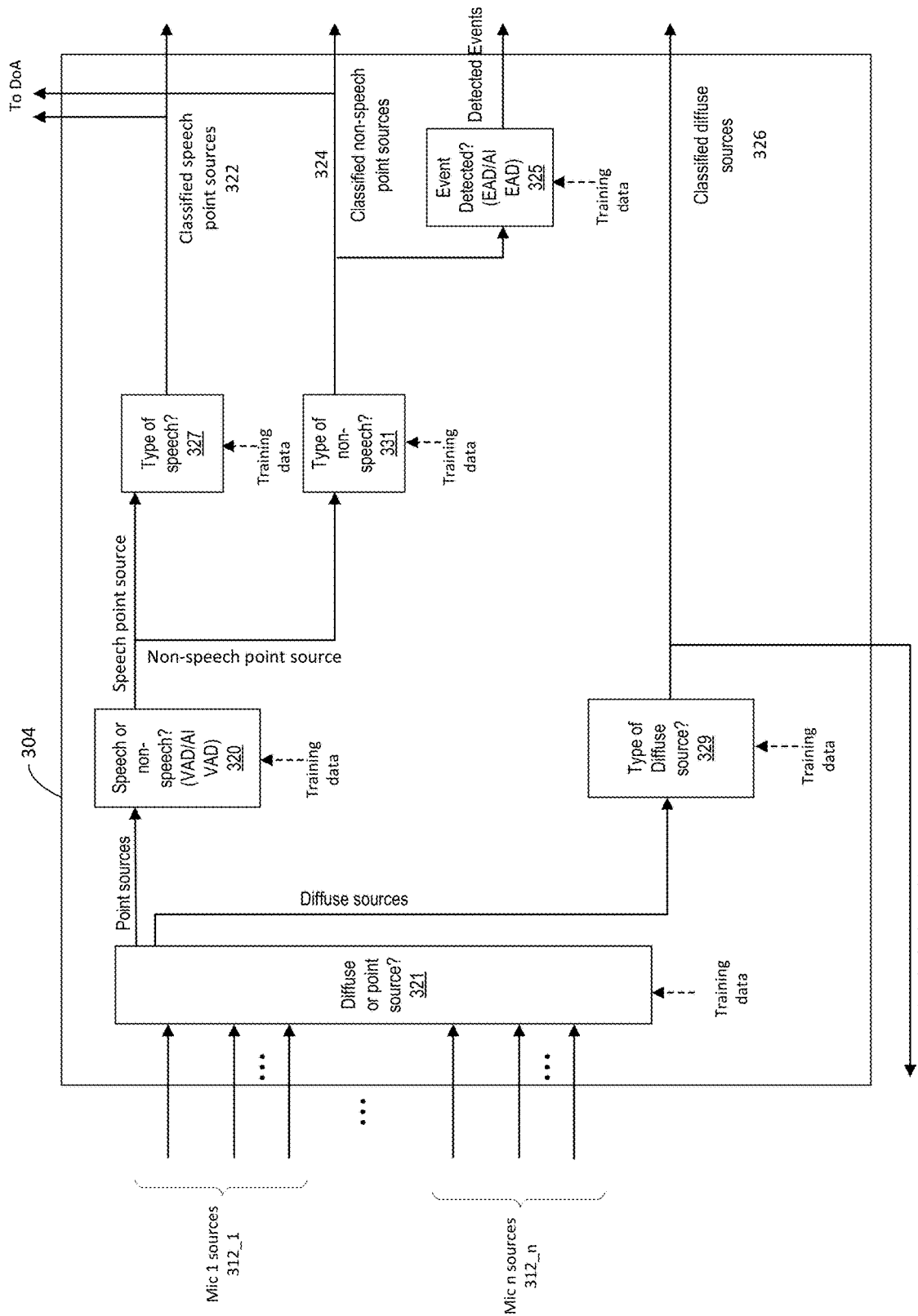

Referring FIGS. 3A and 3C, as shown, the echo canceller 301 can receive a residual echo cancellation signal from the diffuse source classifier 329, which can be used to adjust/improve the echo cancellation. For example, the AEC 301 can process the residual echo feedback to improve non-linear echo cancellation. More generally, for any of digital signal processing or audio processing blocks (e.g., noise suppression, noise gating, auto-mixing, equalization, talker-based personalization, compression, etc.), the residue, signal-to-noise ratio, or other performance parameter can be determined based on the signals separated by the blind source separator 302, and input into the digital signal processing or audio processing block to improve performance.

Any of the blocks in source classifier 304 (the diffuse/point source detector 321, VAD 320, speech source classifier 327, diffuse source classifier 329, non-speech source classifier 331, and/or EAD 325) can apply machine learning or other AI algorithms, including those based on DNN, machine learning, or the like to tune or adapt to the particular environment or otherwise. In such cases, the AI-enabled block(s) can process training data to tune the algorithm, e.g., to the particular deployed environment.

The training data can include publicly available corpuses of data. For example, one or both of the VAD 320 and speech source classifier 327 can train on databases of recorded spoken word (e.g., LibriSpeech, which includes ~1000 hours of 16 kHz spoken English). Some or all of the diffuse/point source detector 321, diffuse source classifier 329, non-speech source classifier 331, and EAD can train on databases of curated noise samples (e.g., FSD50K, which includes a data set of human labeled sound events). Moreover, any of the blocks can alternatively or additionally train on data detected by the audio processing engine 125, which can be detected and used as training data on the fly, or stored and accessed at a later time, to train, retrain, or fine tune the neural network or other machine learning or AI model.

It will be appreciated that the output of each operational block 320, 321, 327, 325, 329, 331 of the source classifier 304 of FIG. 3C can include a data stream including any number of classified sources organized in any appropriate fashion. For example, the output streams can organize the sources by detecting microphone 140 and/or venue where detected (e.g., conference room, remotely connected smartphone or laptop, etc.).

Speech Source Processing—Scanning, Selecting, and Mapping Sources

Figure 3D:
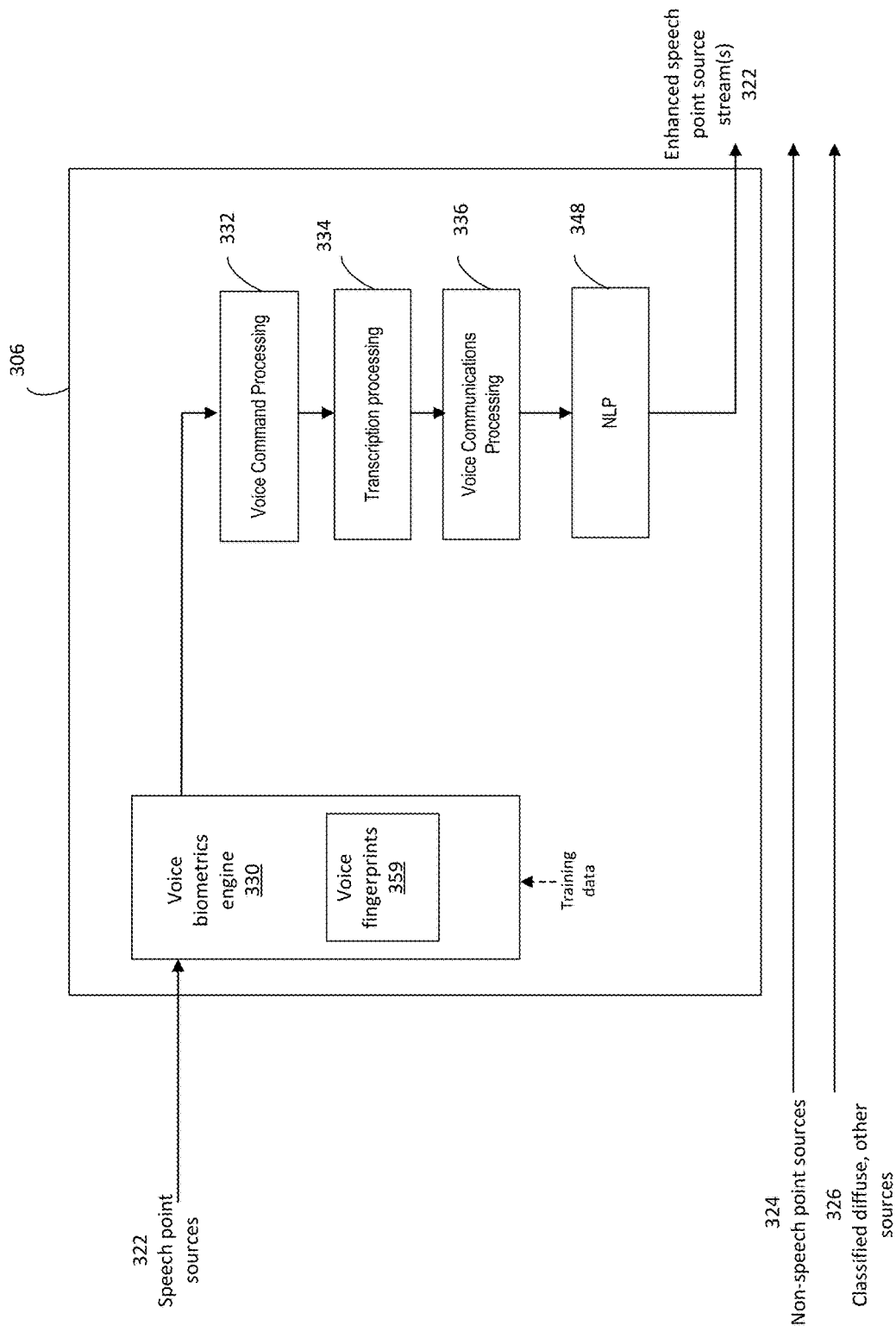

FIG. 3D shows a detailed view of the speech source processor 306 according to certain embodiments. The speech source processor 306 receives signals corresponding the speech point sources 322 from the source classifier 304. The speech source processor 306 includes a voice biometrics engine 330 that can be configured to map the point speech source stream 322 to unique talkers in the audio environment, among other functions. The voice biometrics engine 357 can generate a running list of talkers present in one or more rooms, such as the rooms 200d, 200e of the environment 200c of FIG. 2C, and identify which speaker is talking at any given time by processing the point speech source stream 322 provided by the source classifier 304.

The voice biometrics engine 330 can assign unique acoustic speech signatures to each speaker. For instance, the voice biometrics engine 330 can perform enrollment and verification phases to record and extract a number of features from a voice print for different talkers and then compare speech samples in the separated sources in the point speech source stream 322 against the previously created voice print. The speech samples can be compared against multiple voice prints to determine best match, such as the voice prints stored in memory in the voice fingerprint repository 359, which can be stored in the storage 121, network storage 131, or other appropriate location. In some embodiments, the voice biometrics engine 357 can implement text-dependent recognition, such as by using a common pass phrase or other prompt to enroll and verify talkers, or text-independent recognition, where speakers are identified with a speech recognition algorithm that does not rely on a talker's conscious knowledge or prompts for enrollment. Depending on the embodiment, the voice biometrics engine 357 can apply a variety of different AI or non-AI algorithms including frequency estimation, Markov models, Gaussian mixture models, pattern matching algorithms, neural networks, linear predictive coding (LPC), or the like. Cosine similarity can be used to compare speech against voice prints.

The biometrics engine 357 can supplement the point speech source stream 322 with biometrics information. For example, the biometrics engine 357 can insert flags in the point speech source stream 322, where each flag indicates a biometrically identified talker associated with a source in the enhanced point speech source stream 322.

The speech source processor 306 can include a voice command processing engine 332 configured to process the supplemented point speech source stream 322, e.g., to perform an AI "wake word" scan on the speech sources, and select and map sources for voice command services. For example, the voice command processing engine 332 can identify utterances of pre-determined wake words, extract commands from speech uttered subsequent to the wake word for controlling a voice command service, such as a cloud-based voice command service (e.g., Amazon Alexa, Siri, etc.), and/or embed corresponding metadata to the point speech source stream 322. The voice command processing engine 332 can additionally format the point speech source stream 322 for compatibility with an external voice command service.

The speech source processor 306 can further include a transcription processing engine 334 configured to scan, select, and map dominant speech sources for transcription. For example, the transcription processing engine 334 can, for speech content in the supplemented point speech source stream 322, identify and process flags in the stream corresponding to the talker that uttered the speech content and/or convert the point speech source stream 322 into a format compatible with transcription processing software. In this manner, local or remote audio transcription software can process the audio stream to generate a transcript that embeds information accurately identifying each talker.

The speech source processor 306 can additionally include a voice communications processing engine 336, which can process the supplemented point speech source stream 322 to scan, select, and map speech sources for voice communications. For instance, the third scanning/mapping block 336 can identify and output speech source content that will be sent to the second network channel 139 to be reproduced and audibly broadcast to the users in the environment via the loudspeakers 150, third party devices 150, or other deployed devices 110. The voice communications processing engine 336 can also filter out certain other speech content. As an example, where a conference call user utters a wake word followed by a command (e.g., "Alexa, turn up the volume."), the voice command processing engine 336 may exclude the utterance from voice data sent to the network channel 139 for broadcast to the other users via one or more of the loudspeakers 150, third party devices 180, or other deployed devices 110. The speech source processor 306 can additionally reformat the point speech source stream 322 for compatibility with external voice communication protocols or applications.

The speech source processor 306 can also include a natural language processor (NLP) 348, which can be configured to combine rule-based human language modeling with machine learning to process and "understand" the speech source content. The NLP 348 can perform a variety of NLP tasks including speech-to-text, part of speech tagging, word sense disambiguation, named entity recognition, emotion or sentiment analysis, or the like. The NLP 348 can apply custom NLP algorithms to perform these and other tasks based on which biometrically identified talker uttered the speech. For example, the NLP 348 can detect emotion and sentiment information relating to each identified talker. As one example, the NLP 348 can be configured to process speech source content from a given talker to detect emotion or sentiment, and pass metadata indicative of the emotion/sentiment to a transcription voice service 360, which can use the emotion/sentiment metadata to add contextual information to the transcribed speech (e.g., John [joking]: "Mike, you are the worst!"). Or, as another example, in a conference call, the mixer/control engine 127 can respond to a talker's emotion detected by the NLP 348 to cause an avatar displayed on third party devices 180 or other displays in the environment 100 to change appearance, reflective of the talker's emotion.

Any of the engines in speech source processor 306 (the voice biometrics engine 330, the voice command processing engine 332, the transcription processing engine 334, the voice communication processing engine 336, and/or the NLP 348) can apply machine learning or other AI algorithms, including those based on DNN, machine learning, or the like to tune or adapt to the particular environment or otherwise. In such cases, the AI-enabled block(s) can process training data to tune the algorithm, e.g., to the particular deployed environment. For instance, the voice biometrics engine 330 can implement machine learning to improve recognition of unique speakers, and the voice command processing engine 332 can implement machine learning or other AI to improve wake word detection.

The training data can include publicly available corpuses of data, or customized data sets. For example, one or more of the voice biometrics engine 330, voice command processing engine 332, transcription processing engine 334, voice communications processing engine 336, and the NLP 348 can train on data including recorded voice fingerprints or other clips from a diverse group of speakers (e.g., male, female, child, adult, etc.). Moreover, any of the blocks can alternatively or additionally train on data detected by the audio processing engine 125, which can be detected and used as training data on the fly, or stored and accessed at a later time, to train, retrain, or fine tune the neural network or other machine learning or AI model.

While the speech processor 306 illustrates the speech point source stream 322 as a single stream, sequentially processed by the various engines 330, 332, 334, 336, 348, in some embodiments one or more of the engines can output separate streams. For instance, the voice command processing engine 332 can output a separate stream for transmission to the voice command service 358, and the transcription processing engine 334 can output a separate stream for transmission to the transcription processing service 360. These separate streams can be received and processed by the audio signal processing unit 308, or forwarded directly to the appropriate services 114, depending on the embodiment.

Source-Customized Audio Signal Processing

Figure 3E:
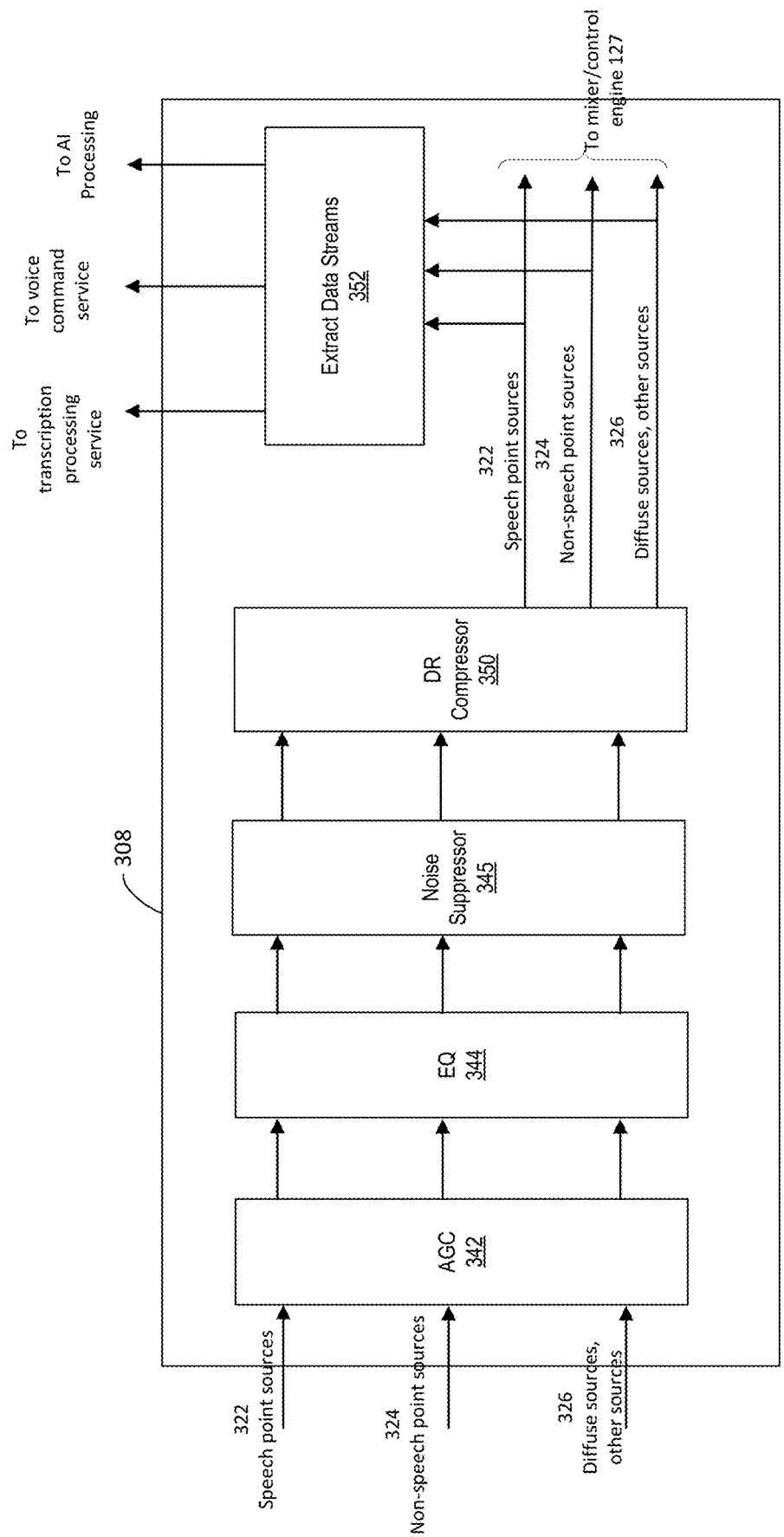

FIG. 3E shows an embodiment of the audio signal processing unit 308, which can generally be configured to apply audio signal processing to the source separated data streams 322, 324, 326, where some or all of the signal processing operations can be customized, optimized, and/or personalized based on information relating to the source. For example, the audio signal processing unit 308 can be configured to apply custom digital signal processing or other custom processing to audio content based on the type of source or based on the identify of a talker or identify of another source. The illustrated audio signal processing unit 308 includes an automatic gain controller (AGC) 342, an equalizer (EQ) 344, a noise suppressor 345, and a compressor 346.

The AGC 342 can apply closed-loop feedback amplification or open loop feedforward amplification to audio content in the received input streams, including the point speech source 322, non-speech point sources stream 324, and diffuse sources stream 326, to maintain a desired signal amplitude or profile speech content, such as to equalize average volume from different sources. The AGC 342 can be configured to apply a custom feedback control, e.g., on a speaker-by-speaker basis (e.g., different custom profile for each unique speaker), or based on the type of source (e.g., different custom profile for human speech versus non-speech sources).

The EQ 344 equalizes audio content, e.g., by adjusting the volume of different frequency bands within the audio content. The EQ 344 can be configured to apply a custom equalization profile, e.g., on a speaker-by-speaker basis (e.g., different custom profile each unique speaker), or based on the type of source (e.g., different custom profile for human speech versus non-speech sources). Applying specific EQ settings for each biometrically identified speaker can improve sound quality because each voice is unique and has differences in pitch, timber, and tonality.

The noise suppressor 345 can implement noise gating, spectral masking, or other noise reduction techniques to reduce noise in the source streams 322, 324, 326. The noise suppressor 345 can implement custom noise suppression algorithms depending on the source e.g., on a speaker-by-speaker basis (e.g., different custom profile each unique speaker), or based on the type of source (e.g., different custom profile for human speech versus non-speech sources).

The compressor 346 can apply dynamic range compression to the audio content. For example, the compressor can apply custom dynamic range compression algorithms depending on the sound source. Different compression algorithms can be applied based on the type of source (e.g., speech source, non-speech source, diffuse source) or the specifically identified unique source (e.g., biometrically identified talker 1 versus biometrically identified talker 2, noise source 1 versus noise source 2).

The AGC 342, EQ 344, noise suppressor 345, and DR compressor 350 can be arranged in generally any order, depending on the embodiment, and any of these blocks can implement machine learning or AI algorithms, which can processing training data to tune to the deployed environment.

Referring now to both FIGS. 3A and 3E, the audio signal processing unit 308 can output one or more output streams, including streams for transmitting to the mixer/control engine 127, which can comprise the speech point sources stream 322, non-speech point sources stream 324, and diffuse sources stream 326, which can be output to the mixer/control engine 127. The illustrated audio signal processing unit 308 additionally includes a data stream extractor 352, which can extract, format, and/or package additional data streams, such as for transmission to the services 114 or other component. These data streams can comprise streams for the cloud voice command service(s) 358, transcription processing service(s) 360, and/or AI processing service(s) 366, for example, which can be part of the system 100 or remote (e.g., third party cloud services). In some other embodiments, the speech source processor 306 forwards one or more of these streams (e.g., the voice transcription stream or the voice command stream) directly to the services 114, and in such cases the streams are not first processed by the audio signal processing unit 308.

The voice transcription stream can include content generated by the transcription processing engine 334. The data stream(s) transmitted to the AI processing service(s) 366 can be used by the AI processing service 366 to tune or train AI models, which can train on aggregated data received from multiple audio/video systems 100. As an example, separated, classified, non-speech source content can be used by an AI processing service 366 to train AI models (e.g., neural network-based models) to identify and suppress noises (e.g., fans, typing, paper crumpling, or the like). In some embodiments, the audio processing engine 125 performs the AI processing on-board, and can suppress noise specific to the deployed environment. The voice command sources stream can include wake words, indications that wake words have been uttered by authorized individuals, or other voice commands extracted from the voice command processing engine 332 of the speech source processor 306.

Some voice command systems are designed to respond to wake words uttered only by a select individual or set of individuals. Because the audio processing engine 125 employs blind source separation, voice activity detection, biometrics, and/or the other described techniques, the audio processing engine 125 can reliably extract not only the wake word, but also the specific source that uttered the wake word, reducing false positives. Upon detecting that a wake word has been uttered by an authorized talker, the audio processing engine 125 can inform the voice command service 358 that the wake word(s) has been uttered by an authorized talker. One example of a command that can be issued to the voice command service 358 is "turn on conference room." Upon receiving such a command, the voice command service 358 can respond by issuing appropriate commands to the system 100, causing the mixer/control engine 127 to command any of the deployed devices 110 to activate, such as to enable microphones 140, loudspeakers 150, cameras 160, user interfaces, or other control devices 170, displays, projectors, or other components of the microphone system 100. As another example, the system 100 may be configured to begin recording in a lecture hall when the instructor's issues a command to "start lecture capture," while other voices are ignored. In this case, the audio processing system 121 informs the voice command service 358 that the wake words have been uttered, and the voice command service 358 can respond by issuing commands to the system 100 to cause the mixer/control engine 127 to command one or more microphones 140 and cameras 160 to activate, and to cause the mixer/control engine 127 to include/amplify the separated audio source corresponding to the instructor's speech in a broadcast stream transmitted to the deployed devices 110 for broadcast over the second network channel 139 and/or in a recording stream for storage, while excluding/dampening speech uttered by others talkers.

Detecting Signal to Noise Ratio and Direction of Arrival

Referring to FIG. 3A, the audio processing engine 125 can include directionality engine 317 and a signal strength engine 338.

The directionality engine 318 can process separated source signals 312_1-312n provided by the BSS 302, classified point source streams 322, 324 output by the source classifier 304, the enhanced speech source stream 322 output by the speech source processor 306, or processed point source streams 322, 324 output by the audio signal processing unit 308 to determine directional information relating to the point sources. For example, the determined directional information can include an angle indicating an angle of arrival (e.g., altitude and azimuth) of the sound source at a microphone 140, or at an individual microphone element M1-Mn in the microphone 140. Depending on the embodiment, the directionality engine 318 can use time or phase delays between microphone elements M1-Mn to determine the direction of arrival for the extracted sources.

DOA or other directionality information generated by the directionality engine 318 can be used to improve performance. For example, in response to directionality information, the mixer/control engine 127 can adjust the composition of the output streams provided to the loudspeakers 150 and other deployed devices, or the mixer/control engine 127 can control operation of the deployed devices (e.g., to control physical or digital panning/tracking of one or more cameras 160, to pan to a particular talker or other source extracted by the BSS 302). Or, where the audio processing system 101 includes a beamformer, the mixer/control engine 127 can, in response to the DOA information, control a microphone 140 to focus a beam on a talker or other extracted sound source, or to disallow a beam from detecting sound from a given direction, such as to avoid picking up sound from a noise source. Directionality information can also be used to map out locations of the various sources in a room. Use of directionality information will be discussed in more detail below.

The signal strength engine 338 can determine an actual or estimated SNR or other signal strength/quality metric for some or all of sources. For example, the signal strength engine 338 can compute an SNR using the root mean squares of the detected signal and noise voltages, e.g., using the formula SNR=20*log10($V_{rms}$ Signal/$V_{rms}$ Noise), or some other appropriate formula. While the illustrated embodiment calculates SNR for the classified source streams 322, 324, 326 output by the source classifier 304, the signal strength engine 338 can alternatively or additionally calculate signal strength for the source streams 312_1-312_n output by the BSS 302, or the source streams 322, 324, 326 output by the speech source processor 306 or audio processing unit 308.

The signal strength engine 338 outputs indications of the determined signal strengths, which can be used by various components in the system 100, including by components in the audio processing engine 125 (e.g., BSS 302, speech source processor 306, source classifier 304, and audio processing unit 308), by the mixer/control engine 127, or by the auditory scene analyzer 129. For example, the mixer/control engine 127 can respond to measured signal strength information to adjust the composition output audio streams, and/or to control operation of deployed devices 110, such as the microphones 140 and loudspeakers 150. The auditory scene analyzer 129 could, as one example, use signal strength information to calculate a distance or estimated distance between a detecting microphone 140 and a sound source. Use of signal strength information will be discussed in more detail below.

Smart Mixing and Device Control Using Separated Source Content

Figure 3F:
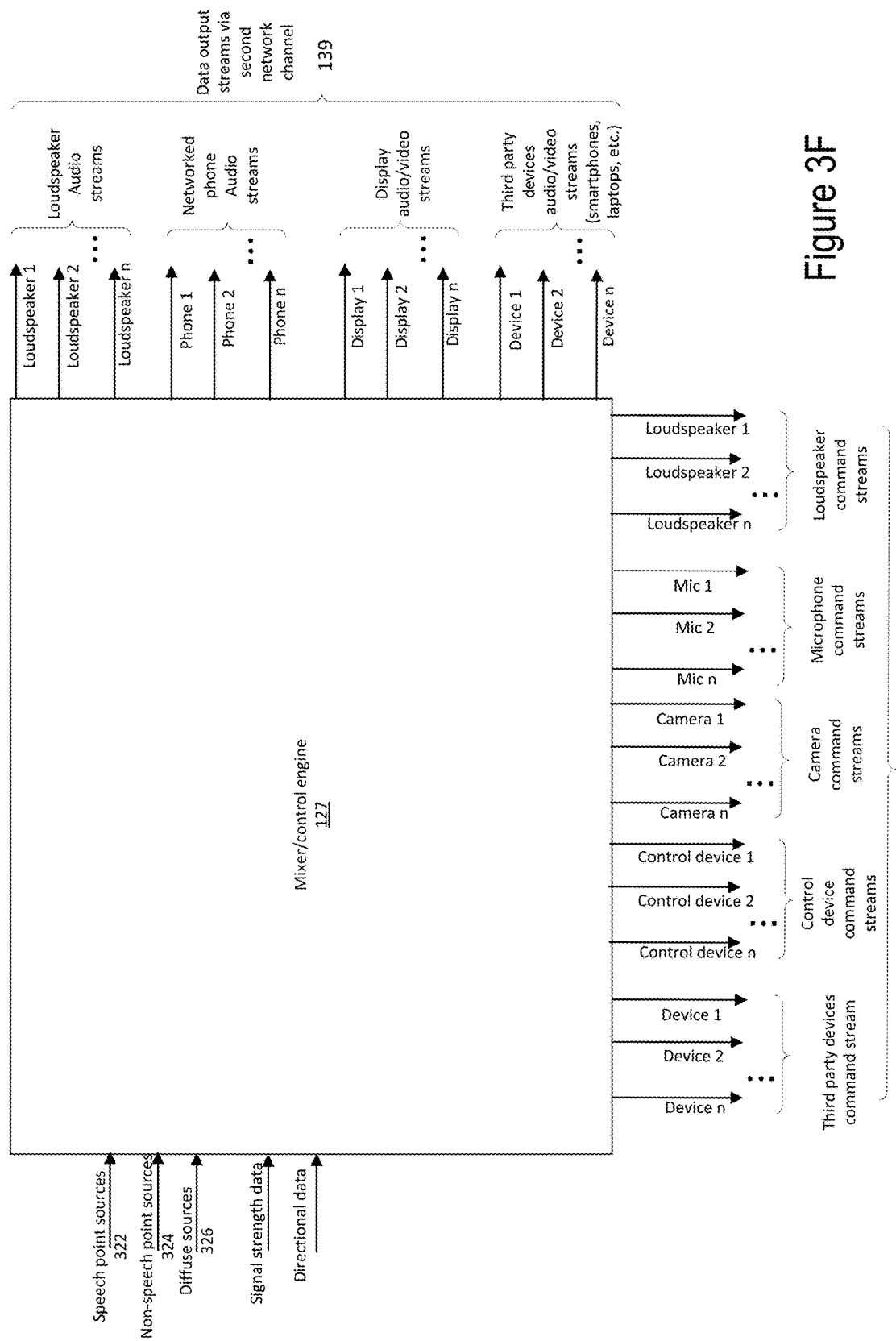

FIG. 3F shows an example of the mixer/control engine 127, which can generally receive the source-separated/classified audio streams 322, 324, 326 and other data (e.g., the signal strength and directional data), and orchestrate operation of the audio environment based on processing of the received streams and data.

For instance, as shown, the mixer/control engine 127 can receive the separated and classified sound sources and mix them together into separate customized output streams for each of the loudspeakers 150, third party devices 180 (e.g., smartphones, laptops, etc.), and other audio output devices in the environment. The mixer/control engine 127 provides the mixed output streams to the second network channel 139, such as for streaming to the deployed devices 110 in the one or more networked conference rooms or other systems, for playback on loudspeakers 150, networked telephones, or the like. The mixer/control engine 127 can similarly generate video output streams based on data received from the cameras 160 or third party devices 180, e.g., for streaming for display on one or more of the deployed devices 110, such as laptops, smartphones or other third party devices 180, or standalone displays such as the displays 208a-208b in the conference rooms 200d, 200e.

With respect to the composition of the audio output streams, the mixer/control engine 127 can include audio content in an output stream on a source-by-source basis using any of the techniques described herein, such as to include and/or amplify certain desired sources, such as one or more speech sources, to exclude or attenuate certain other sources, such as noise sources.

The mixer/control engine 127 can also control the deployed devices 110 based on processing of the separated and classified sources, the signal strength data, and/or the directional data. For instance, the mixer/control engine 127 can generate command streams, which are communicated over the second network channel 139 for controlling the loudspeakers 150, microphones 140, cameras 160, control devices 170, and/or third party devices 180.

Operation of the mixer/control engine 127 to orchestrate operation of the audio environment is discussed in further detail below.

Exemplary Environment Repository

FIGS. 4A-4C show examples of data generated and maintained by an audio processing system 100. FIG. 4A shows an example of an auditory environment or auditory scene table 400, which contains information relating to the auditory environment in which the audio system 100 is deployed. The environment table 400 can be a relational database, with pointers to other tables including the source table 402 of FIG. 4B and the microphone table of FIG. 4C, and a table (not shown) of pointers to maps of various venues in the environment. The database and its constituent tables 400, 402, 404 can be stored in the environment repository 112 of FIGS. 1 and 3A, for example, and can be generated by the auditory scene analyzer 129 or other appropriate component of the system 100.

The environment table 400 includes a row for each venue in the environment, each indexed by a Venue Index V1-Vn. A Venue Type field specifies the type of each listed venue (e.g., conference room, remote connection, amphitheater, concert hall, lecture hall, outdoor area, small room, large room, etc.). A Venue ID field includes information uniquely identifying the venue, and can be an alphanumeric string or other appropriate identifier. A venue map/topography field includes a pointer to a stored map or topographical representation of the venue, which can include a 3D representation of the venue. A Mics in Venue field specifies which microphones 140 are deployed in each venue, and includes pointers to entries in the microphone table 404 for each listed microphone 140. A Sources Detected in Venue field includes a running list of sources detected by the system 100 in the environment, and contains a list of pointers to entries in the sources table 402 for each listed source.

The illustrated table includes two conference room venues (NY Conf. and SF Conf.) and a remote connection such as a web conference connection to Employee 1's laptop.

As shown in FIG. 4B, the source table 402 includes a row for each source identified in the environment, each indexed by a Source Index S1-Sn. A Source Type field specifying the type or classification of source, and a Source Sub-Type specifying a sub-type or sub-classification. These fields can be populated by the auditory scene analyzer 129 with information determined by any combination of the source classifier 304, the BSS 302, the speech source processor 306, or the audio signal processor 308 of FIGS. 3A and 3E.

The Unique Person ID field contains information to uniquely identify an identified talker, such as a talker identified by the biometrics engine 330 of the speech source processor 306 of the audio processing engine 125, and can include alphanumeric strings identifying the individual. Entries in this field can point to an employee database, for example. A Unique Non-person ID field contains information to uniquely identify non-person sources, and can also include an alphanumeric strings. A Source Location field includes an entry specifying the venue in which the identified source Sn has been detected, and can include pointers to the venue table 400. A Detecting Microphones field specifies which microphones 140 have detected the source, and includes pointers to the microphone table 404 for each detecting microphone 140.

A Source Position field includes information specifying a detected position of the source within the environment. The position information can be relative information, and in the illustrated example includes a distance and polar angle from each detecting microphone 140, while in other embodiments the position information additionally or alternatively includes a three-dimensional x, y, z coordinate position of the source within the venue, e.g., referenced to a venue map.

The illustrated source table 402 lists five sources: 1) speech uttered by an adult male Employee 1 (S1) located within a first venue Va (e.g., a conference room); 2) sound generated by Employee 1's smart phone (S2) (e.g., ring tone, music, etc.) located with Employee 1 in the first venue Va; 3) typing sound (S3) generated by adult female Employee 2 within a second venue Vb; 4) speech uttered by Employee 2 within the second Venue Vb; and 5) diffuse traffic noise detected in the first Venue Va.

The microphone table 404 of FIG. 4C contains a row for each microphone in the environment, each indexed by a Microphone Index M1-Mn. A Mic Type field specifies the type of microphone. While the illustrated embodiment includes a single Mic Type field, multiple fields can be used to provide more granular information, such as where a first field defines a mic category (e.g., array, single element, etc.), and additional fields define additional information such as sub-type, manufacturer information, model number, etc.

A Placement Category field species a type or category of placement location (e.g., ceiling, wall, laptop, podium/ table), and can be used by the audio processing system 121 in processing sound detecting by the microphone 140. A Placement Venue field specifies which venue Vn the microphone 140 is placed in, and includes a pointer to the corresponding entry in the venue table 400. A Venue Position field specifies a position of the microphone 140 within the venue, and can include x, y, z coordinates of the microphone relative to the venue map stored in the venue map database. A Detected Sources field contains a running list of sources detected by the microphone 140, and can include a pointer to the corresponding entries in the source table 402. The microphone table 402 can also include directional information generated by the directionality engine 318, and signal strength information generated by the signal strength engine 338. A Source Direction of Arrival field stores the detected direction of arrival for each source at the respective microphone 140, and a Detected Source SNR/level field stores an SNR or signal magnitude/energy level for each source detected at the respective microphone 140.

The illustrated microphone table 404 lists four microphones including: 1) a first array microphone M1 of a first type placed on a ceiling in a first venue Va; 2) a second array microphone M2 of the first type placed on a wall in a second venue Vb; 3) an array microphone M3 of a second type integrated in a laptop within the third venue Vc, where the laptop can be remotely connected via web conference to the first and second venues Va, Vb; and 4) a single element microphone M4 mounted to a podium or table within the first venue Va, which may be used by a lecturer, for example.

Figure 3G:
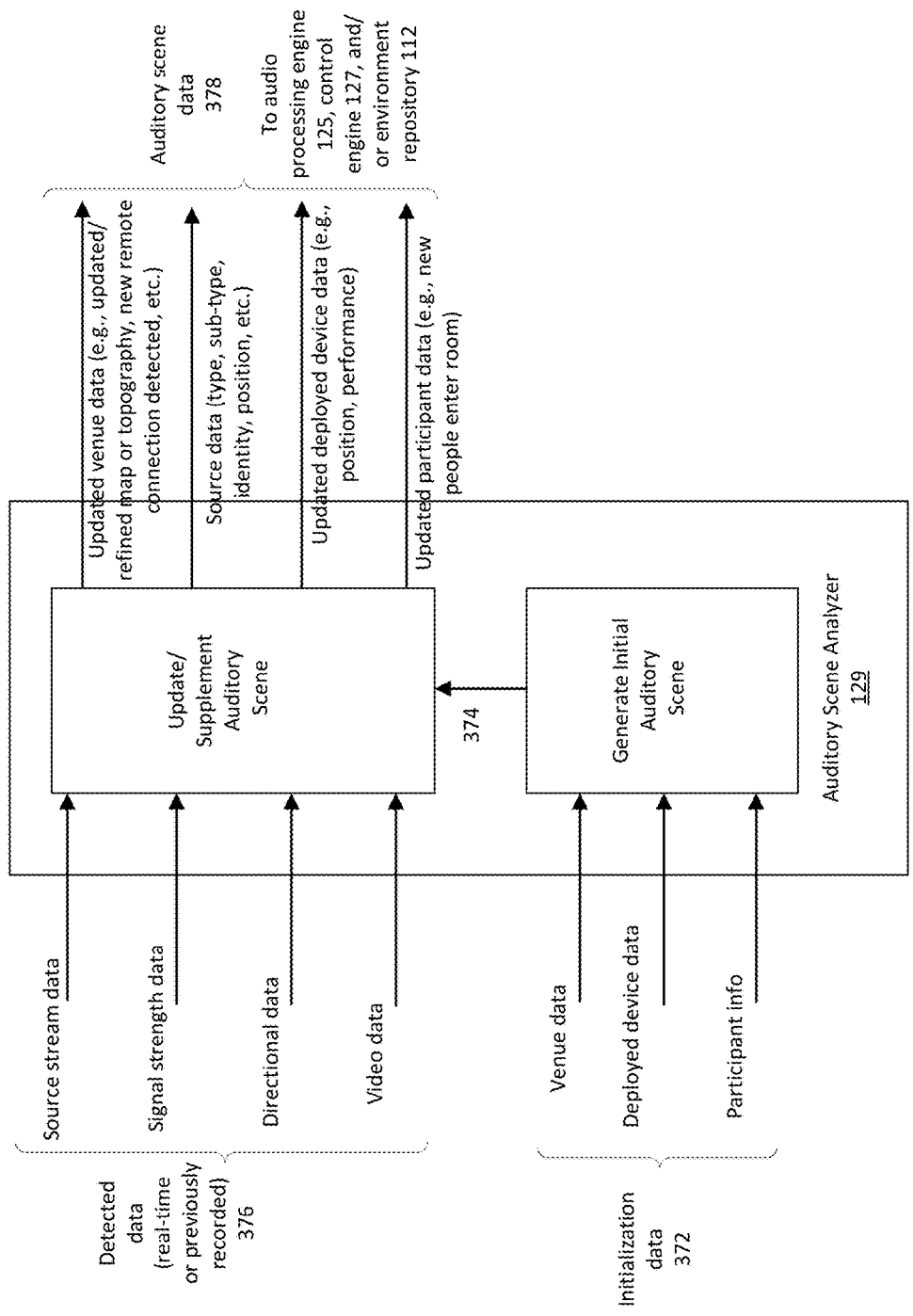

Auditory Scene Analysis—Analyzing the Scene and Populating the Environment Repository Referring now to FIGS. 3A and 3G, the auditory scene analyzer 129 can be configured to process a set of initialization data 372 in order to generate an initial representation 374 of the auditory "scene" in which the system 100 is deployed. The analyzer 129 can further process detected data 376 detected and/or generated by the system 100 to dynamically supplement and update the initial auditory "scene," and output updated auditory scene data 378 that collectively represents the current state of the auditory scene. The auditory scene data 378 can be organized into a database, which can include tables similar to those of FIGS. 4A-4C. The auditory scene data 378 can be used by the audio processing system 121 in a variety of ways to improve performance and user experience.

The initialization data 372, which the analyzer 129 uses to construct the initial representation 374 of the auditory scene, can be provided to the analyzer 129 before the audio/video conference or other event begins, such as during setup/ configuration, e.g., by manual input by an administrator, or during an auto-discovery process implemented by the processing core 120. For example, the auditory scene analyzer 129 can populate the tables 400, 402, 404 with initial data at the time of environment deployment or configuration, such as where an installer or other administrator interacts with a user interface of an administration application executed by the system 100 to add entries for each venue, populate the environment table 400 with maps of each venue, assign Venue IDs to each venue, populate the Mics in Venue field for each installed microphone 140, etc.

As shown in FIG. 3G, the initialization data 372 can include initial venue data. Venues can be the different physical and/or virtual locations in an audio environment. In a corporate audio/video conference, the venues may include a group of networked conference rooms, laptop/smartphone remote connections, networked telephone connections, etc. In a sports stadium, the venues may include an outdoor court/field or portions thereof, restaurants, private boxes, corridors/hallways/walkways, etc. The initial venue data can include some of the venue information shown in the environment table 400 of FIG. 4A (e.g., list of venues with each having an index, type, ID, initial map/topography, initial list of microphones 140 and/or other deployed devices 110 in the venue, etc.). An administrator may interact with a GUI to input the initial list of venues, venue types, venue IDs/names, and/or microphones deployed in each venue, can provide one or more digital venue maps to the system 100, and/or provide other physical information about the venues (e.g., actual or relative size [e.g., small, medium, large room, indoor or outdoor setting, etc.). Depending on the embodiment, the system 100 can populate at least some of the initialization data 372 during an auto-discovery process, such as to detect remote connections and/or microphones 140 or other deployed devices 110 installed in each venue.

The initialization data 372 can also include initial data relating to the deployed devices 110, which can be entered manually or auto-discovered, depending on the type of information and the embodiment. This can include some of the information shown in the microphone table 404 depicted in FIG. 4C, such as a list of the deployed devices, a type (e.g., microphone, loudspeaker, camera, display, etc.), a sub-type (e.g., array microphone, single element microphone, tweeter, woofer, full-range loudspeaker, etc.), more granular information about the specific device (e.g., manufacturer/brand, model, technical specifications/capabilities such as camera sensor resolution, loudspeaker max decibel output, microphone sensitivity, etc.), device placement info (e.g., placed on wall, ceiling, podium, table, integrated laptop camera or microphone, etc.), placement venue, and/or position within venue. In some embodiments, the deployed devices 110 have GPS transceivers or other functionality that allows for electronically determining the location of the devices 110 within the environment. The system 100 can interrogate the microphones 140 deployed in each venue to populate some or all of the information in the Mics in Venue field of the table 404 of FIG. 4C.

A variety of other initialization data 372 can be used. For example, in the illustrated embodiment, the initialization data 372 includes participant information, which can include a list of people who are expected to or are actually participating in the audio/video conference or other event, as well as information about those participants. The initial participant information can include a list of expected participants who have RSVP'd, registered, and/or been invited to attend the event, as well as information relating to those participants (e.g., employment status or other relationship to a hosting company or organization, role in the event [e.g., main speaker, authorized speaker, non-participant organizer or support staff], a venue from which the person is expected to attend the event, etc.).

As indicated, the input data also includes detected data 376, which can be used by the analyzer 129 to dynamically update and enrich the auditory scene representation. The detected data 376 can include any data detected/generated by the system 100 in real-time, or data previously detected/generated and stored by the system 100, e.g., accessed from the storage 123 local to the processing core 120 or the network storage 131. The detected data 376 can include, without limitation: separated source stream data (e.g., speech point sources 322, non-speech point sources 324, diffuse sources 326), signal strength data (e.g., SNR data from the signal strength engine 338), and directional data (e.g., DOA or other directional information from the directionality calculator 318). For example, the detected data can include data output by any of the components of the audio processing engine 125 or mixer/control engine 127. The detected data can include other types of detected data in addition to audio, including video data captured by the cameras 160, for example.

As shown, the analyzer 129 processes the initial auditory scene representation and the detected data 376 to generate the auditory scene output data 378, which can represent an updated or current state of the auditory scene.

The auditory scene data 378 generated by the auditory scene analyzer 129 can include a variety of information, and in the illustrated embodiment it includes updated venue data, updated deployed device data, updated participant data, and audio source data.

With respect to the venue data, the analyzer 129 can update the venue data based on the source separation and classification performed by the audio processing engine 125 to add a list of audio sources detected in each venue, as shown in the environment table 400 of FIG. 4A. The analyzer 129 can dynamically generate, update, supplement, or refine the venue maps, such as by processing source separated audio data detected by the microphones 140 or performing image processing on video detected by the cameras 160 to the presence of objects/occlusions (e.g., tables, walls, etc.) in a room or other venue. Moreover, the administrator can provide the system 100 with a file containing an initial structural map for a venue, and the system 100 can update and refine the map as it "learns" information about the venue, such as by processing sound detected by the microphones 140, or by performing image processing data collected by the cameras 160, to identify additional structures, occlusions, etc. within the environment.

With respect to the source data, the analyzer 129 can process the source stream data, signal strength, and/or directional data provided by the audio processing engine 125 to maintain a list of sources in the audio environment and a variety of information about the sources. For example, the analyzer 129 can populate some or all of the source table 402 of FIG. 4B by processing the source stream data.

The analyzer 129 can also generate updated deployed device data, which can include new or updated values for any of the information in the microphone table 404 of FIG. 4C. For example, the analyzer 129 can populate the Source Direction of Arrival and Detected Source SNR/Level columns of the Microphone Table 404 by processing the directional data and signal strength data, and can populate the Detected Sources column by based on the source stream data.

The analyzer 129 can also generate updated participant information. For example, the analyzer 129 can detect presence of participants by processing the source stream data to identify the presence of biometrically confirmed talkers in the environment, and update or refine the initial participant information accordingly. The scene analyzer 129 can track a number of unique talkers in a meeting room or other environment, such as by keeping a running list of talkers who have spoken within a window of time (e.g., within the last 1, 5, or 10 minutes).

Auditory Scene Analysis—Position Tracking

The auditory scene analyzer 129 or other appropriate component can further process directionality information from the directionality engine 318 and the speech or non-point source data streams 322, 324 from the audio processing engine to track the position of one or more point audio sources in the system 100.

For example, the scene analyzer 129 can combine voice identification information added to the speech point source data stream 322 by the speech source processor 306 with speech source direction of arrival information received from the directionality engine 318 and/or signal strength indications from the signal strength engine 338 to calculate and track the position of unique talkers within a venue. In some embodiments, the scene analyzer 129 calculates the source position relative to a microphone 140 using received DOA and SNR, and then identifies the position of the source within the venue by comparing the relative position of the source to the microphone 140 with the microphone position (Venue Position of FIG. 4C) within the venue. In such a manner, the scene analyzer 129 can generate position information to dynamically track the movement or position of a talker or other point source within a room or other environment. The scene analyzer 129 can generate position and/or movement information for each talker or other point source (e.g., direction relative to microphones, coordinates within an environment, rate/direction of movement, etc.), which can be used by the audio/video system 100 for different purposes. Such position information can be updated in the Source Position column of the source table 402 of FIG. 4B.

Moreover, position information can be used to "hand off" a talker from a handing microphone 140 to a receiving microphone 140. The handoff can be achieved by muting the handing off microphone and unmuting the receiving microphone, wherein the muting and unmuting can be achieved by the mixer/control engine 127 adjusting the output stream to remove separated speech content associated with the talker detected by the handing off microphone 140, and to add separated speech source content associated with the talker detected by the receiving microphone 140. Or the muting and unmuting can be achieved by the mixer/control engine 127 commanding the handing-off microphone 140 to enter a mute mode, and commanding the receiving microphone 140 to activate. In other implementations, the hand-off can be achieved by the mixer/control engine 127 gradually reducing in the output stream the contribution of the talker's speech source content from the handing-off microphone 140, while gradually increasing in the output stream the contribution of the talker's speech source content form the receiving microphone 140, or by the mixer/control engine 127 commanding the handing-off microphone 140 to gradually reduce in sensitivity while commanding the receiving microphone 140 to gradually increase in sensitivity.

The position information can also be used to control camera operation, e.g., to move motorized cameras 160 or to adjust electronic pan, tilt, zoom (EPTZ) to track talkers as they move throughout a room, or to hand-off between cameras 160 such as when a dominant talker moves from a field of view of a first camera 160 to the field of view of a second camera 160.

Signal to noise ratio estimates or other signal strength indications from the signal strength engine 338 can be used in addition direction of arrival information from the directionality engine 318 to hand-off talkers between cameras 160 or microphones 140, e.g., in combination with the position data.

The analyzer 129 can generally use the position information to update one or more venue maps, such as those stored in the environment table 402 of FIG. 4A, to include up-to-date positions for some or all of the sources identified within the venue. The analyzer 129 can dynamically update the position as talkers move throughout the environment.

Source Separated Data Stream Structure and Formatting

Figure 5:
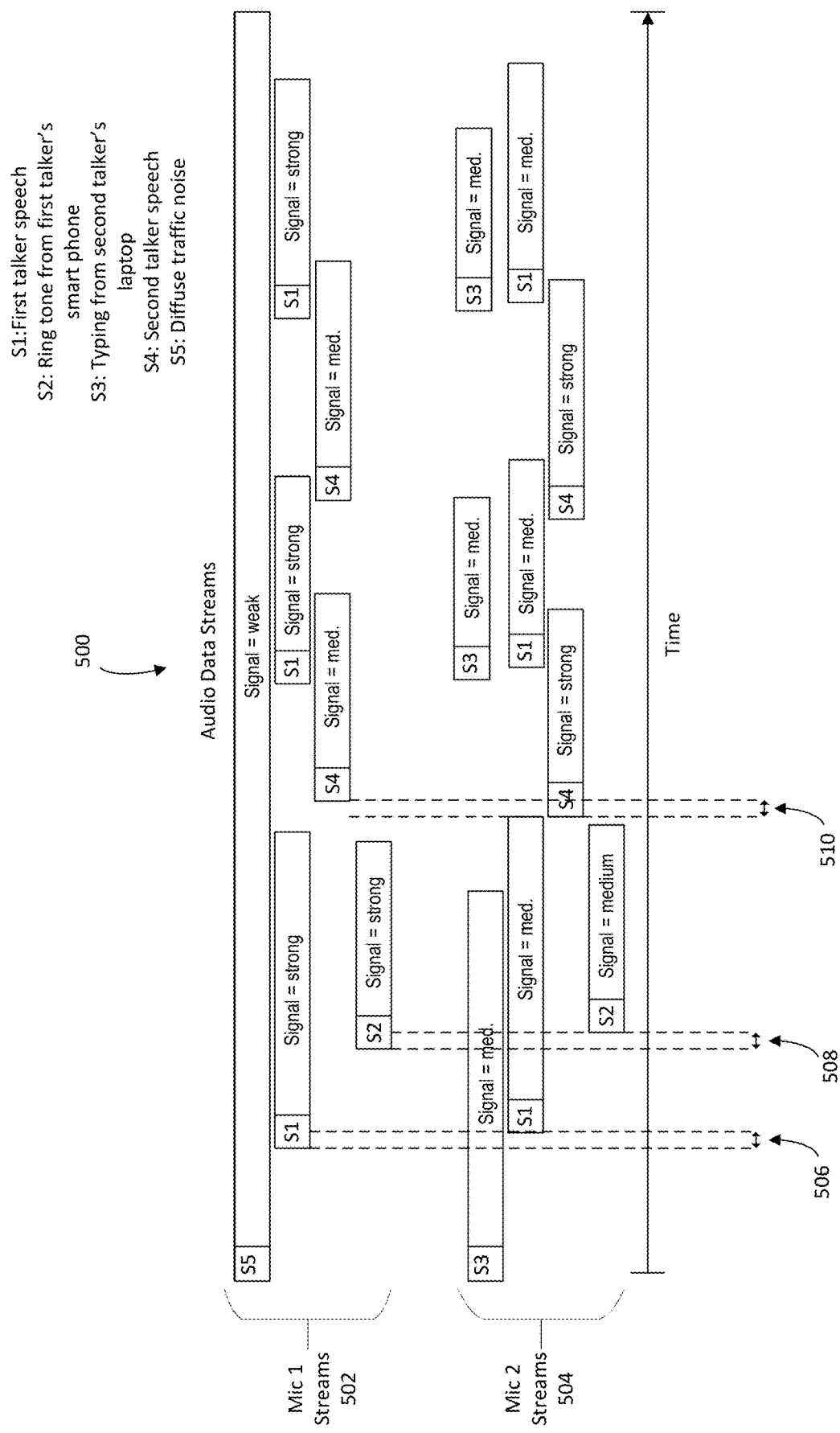
FIG. 5 depicts streams of detected audio data separated, classified, and processed by an audio processing system, according to certain embodiments.

FIG. 5 shows a chronological view 500 of examples of streams of audio data detected by the system 100, where the streams have been separated and processed by the audio processing engine 125 according to certain embodiments. For example, the audio processing engine 125 or other appropriate component can construct the source audio streams 502, 504 to include both source-separated payload data (audio signal levels or frequency content) and metadata (e.g., time stamps, source indicators, biometric identifiers, any of the information in the source repository 241 or tables 400, 402, 404) packaged/formatted in any appropriate manner. The metadata can generally be added/embedded into the source streams by the various components of the audio processing engine 125 on-the-fly, as they process the source streams, for example.

The illustrated audio source streams 502, 504 including four separated source streams 502 detected by a first microphone 140 (Mic 1) and four separated source streams 504 detected by a second microphone 140 (Mic 2). The two microphones 140 (Mic 1 and Mic 2) have overlapping coverage zones and can be positioned within the same room, for example. For instance, Mic 1 can be an array microphone 140 located in the room in proximity to a first talker and Mic 2 can be an array microphone 140 located in the room in proximity to a second talker.

The audio processing engine 125 separates sound detected by Mic 1 into four separate audio data streams: 1) speech S1 uttered by a first talker; 2) ring tone S2 from the first talker's smart phone; 3) typing S3 from a second talker's laptop; 4) speech S4 uttered by a second talker; and 5) diffuse background traffic noise S5.

Mic 1 is situated in the room nearer the first talker than the second talker, such that Mic 1 detects the first talker's speech S1 with a strong signal level, the ring tone S2 with a strong signal level, the second talker's speech S4 with a medium signal level, and the background traffic noise S5 with a weak signal level (e.g., detected through a wall/window), but is not close enough to the second talker to detect their typing sound S4.

Mic 2 is situated in the room nearer the second talker than the first talker, such that Mic 2 detects the first talker's speech S1 with a medium signal level, ring tone S2 with a medium signal level, the second talker's typing S3 with a medium signal level, and the second talker's speech S4 with a strong signal level, but does not detect the background traffic noise S5.

While FIG. 5 depicts the signal levels as falling into three basic categories "weak," "medium," and "strong" for illustrative purposes, the system 100 can extract and maintain a variety of more granular information relating to the detected signal energy (e.g., average signal power, average signal envelope, signal-to-noise ratio, etc.).

As shown, the system can detect inter-microphone delays 506, 508, 510, where each inter-microphone delay is a period of time between a time Mic 1 detects source sound and a time Mic 2 detects the same source sound, or vice versa. For instance, delay 506 is the period between the time Mic 1 detects speech S1 from the first talker and the time Mic 2 detects the same speech, delay 508 is the period between the time Mic 1 detects the ring tone from the first talker's phone and the time Mic 2 detects the ring tone, and delay 510 is the period between the time Mic 2 detects speech from the second talker and the time Mic 1 detects the same speech. While not illustrated in FIG. 5, intra-microphone delays can also be detected and tracked by the system 100, indicating delays between a time sound from a separated audio source stream is detected by a first microphone element within a microphone and the time the same sound is detected by a second microphone element within the same microphone.

While not shown in FIG. 5, the audio processing engine 125 can, in addition to extracting signal level/energy differences and inter- or intra-microphone time delay differences, also extract other information such as inter- or intra-microphone 140 phase differences or detected pitch.

The audio processing engine 125 can use any of the detected signal/energy level information and inter- or intra-microphone delay information in processing the audio source streams.

Several example scenarios will now be described for the purposes of illustrating certain functionality of the audio processing system 100.

Separating Speech and Undesirable Noise Using Signal Strength Measurements

As an example use case scenario, referring to FIG. 2C, the microphone 140a in the first room 200d detects both speech uttered by the person 204a at the front of the room 200d, and simultaneous ringtone noise emanating from a smartphone 212 near the person 204g towards the rear of the room 200d. The BSS 302 separates the combined detected signal into two point sources. The source classifier 304 classifies the two separated sources as point sources (diffuse/point source detector 321), classifies the speech sound as speech (VAD 320) uttered by a male (speech classifier engine 327), and classifies the ring tone as non-speech (VAD 320) and as a phone ring tone (non-speech classifier 331). The speech source processor 306 compares the speech to the voice fingerprint database 359 and identifies the speech as having been uttered by Employee 1. The blocks 342, 344, 345, 350 of the audio processing unit 308 apply custom processing to the identified point source streams based on the identifies of the sources. The audio processing system 100 can additionally 1) update a database in the environment repository 112 to reflect the processing, e.g., in a manner similar to that described with respect to FIGS. 4A-4C, and 2) embed metadata in the source streams including metadata identifying the sources, signal strength information, and/or directional information, e.g., in a manner similar to that described with respect to FIG. 5.

The mixer/control engine 127 receives the speech point source stream (Employee 1), extracts and analyzes metadata in the stream to determine that it is desired human speech. For example, the mixer/control engine 127 can consult a database to determine that human speech is generally desirable and/or that Employee 1 is a known/authorized talker. The mixer/control engine 127 therefore streams the speech content over the second network channel 139 to the loudspeaker 150c in the far-end room 200e (far-end with respect to the talker 204a). The mixer/control engine 127 can additionally route the speech content to one or both of the microphones 150a, 150b in the near-end room 200d (near-end with respect to talker 204a). The mixer/control engine 127 similarly receives the non-speech point source stream (ring tone), extracts and analyzes metadata in the stream to determine that it is tone as undesirable noise, and excludes the phone ring tone from the output streams delivered to the loudspeakers 150a-150c.

The mixer/control engine 127 can additionally use signal strength information to improve the auditory experience. For example, the mixer/control engine 127 can process speech point sources corresponding to the microphones 140a-140d in the near-end room 200d to determine that each of the four microphones 140a-140d are detecting the speech uttered by the person 204a. The signal strength engine 338 can, for each identified detecting microphone 140a, 140b, 140c, 140d, calculate an SNR, estimated SNR, or other signal strength indication associated with the person's 204a speech, which can be stored in the environment repository 112, such as in a table similar to the microphone table 404 and/or embedded in a data stream for each microphone 140 similar to the data streams 500 of FIG. 5. Based on the calculated signal strength, the mixer/control engine 127 can select or emphasize (e.g., amplify) in the output streams to the loudspeakers 150a-150c sound detected by one or more microphones 140 with relatively high signal strength (e.g., the microphone 140a closest to the person 204a), and/or deselect and/or deemphasize (e.g., dampen or eliminate) in the output streams sound detected by one or more other microphones 140 with relatively low SNR (e.g., the microphone 140d furthest from the person 204a).

In addition to or instead of the audio mixer/control engine 127 adjusting the composition of the output streams, the mixer/control engine 127 can adjust operation of the deployed devices 110 to improve system operation. For instance, the mixer/control engine 127 can issue commands over the second network channel 139 to adjust operation of the microphones 140, such as by deactivating or reducing sensitivity of one or more microphones 140 having relatively low signal strength for the person's 204a speech (e.g., the microphone 140d furthest from the person 204a and/or the microphone 140b nearest the ring tone emanating from the person's 204g phone 212). Moreover, the mixer/control engine 127 can issue commands to control operation of one or more of the loudspeakers 150 in response to the signal strength measurements. As an example, when the ring tone begins playing, the signal strength measurements may indicate temporary reduction of SNR of the person's speech detected by the microphones 140a-140d in the near end room 200d while the ring tone is playing in the near end room 200d. In response, the mixer/control engine 127 can command the loudspeakers 150a, 150b in the first room 200d to increase in loudness while the ring tone is playing, thereby temporarily counteracting the effect of the ring tone. The mixer/control engine 127 can command the loudspeakers 150a, 150b to return to their previous loudness levels when the ring tone ends, e.g., in response to the detected signal strength of the talker's 204a speech increasing and/or in response to the microphones 140a-140d no longer detecting the ring tone.

In another scenario, the ring tone or other noise source is located in the far-end room 200e. In such a case, the mixer/control engine 127 can reduce can select or emphasize (e.g., amplify) in the output streams provided to the loudspeakers 150a-150c contributions from sound detected by one or more microphones with relatively high signal strength for the talker's 204a speech (e.g., some or all of the microphones 140a-140d in the room 200e remote from the noise source, and/or deselect and/or deemphasize (e.g., dampen or eliminate) in the output streams contributions from sound detected by the microphones 140e, 140f in the room 200e proximate the noise source. The mixer/control engine 127 can additionally or alternatively adjust the operation of the microphones 140e, 140f in the room 200e to counteract the noise source, such as by deactivating or reducing sensitivity of the microphones 140e, 140f, and/or by increasing the volume of the loudspeaker 150c in the far-end room while the noise source is present, and returning the volume to the previous level when the noise source is no longer present. This can allow a consistent far end speaker loudness relative to room noise loudness, improving the listening experience.

While these example scenarios has been described in the context of a desired point speech source and un-desired cell phone ring tone point noise source, the described techniques are not limited to these specific noise sources. For instance, a similar approach can be taken to other point noise sources, such as a vacuum cleaner and/or undesired laughter uttered by people in either of the rooms 200d, 200e.

Using Directionality Information to Process Sources Based on Detection Zone

In some embodiments, the mixer/control engine 127 includes audio content in the output streams based at least in part on directionality information. For example, the mixer/control engine 127 can receive a DOA for each separated source based on directional data provided by the directionality engine 318, and group together sources into directional zones of coverage based on DOA. The mixer/control engine 127 can, for example, group together one or more sources falling within a first range of DOA into a first zone, group together one or more sources falling within a second range of DOA into a second zone, and so on. The mixer/control engine 127 can then compose the audio output streams on a zone-by-zone basis.

As just one example, if a band, orchestra, or other act is performing on a stage at a concert venue, a particular DOA range for a given microphone 140 in the venue may be designated as corresponding to sound emanating from the stage. The mixer/control engine 127 can group together sources having a DOA within the designated zone and add only those sources to the audio output streams, such as those output streams streamed to one or more loudspeakers 150 in the venue for playback and/or those streamed to one or more smartphones or other third-party devices 180 for live streaming.

Multi-Mic Coexistence

When a single talker is picked up by multiple microphone arrays 140 simultaneously, it can cause unpredictable variations in talker level due to cancellation (reduced talker level) or summing (increased talker level). Some directional-based solutions rely on careful aiming of beams/lobes for each microphone to avoid overlap. By using positional data along with voice biometrics, the audio processing engine 125 can identify unique talkers, relative position of the talkers to each of the mics and prevent a single talker from being picked up again by distant microphone array(s) 140 by cancelling out or reducing the source separated content corresponding to that talker from the distance microphone array(s) 140.

The audio processing engine 125 can use SNR estimates from the SNR estimation engine 338 and/or position data from the position information database 341 to determine which microphones 140 to cancel out. For example, when the audio processing engine 125 detects that separated sound content for a first biometrically identified talker has been picked up by multiple microphone arrays 140, the audio processing engine 125 can cancel out or reduce content for that talker from all detecting microphones except the one that is closest to the talker or has highest SNR. Or the audio processing engine 125 can blend content for that talker from multiple microphone arrays with weightings based on position, DOA, and/or SNR.

Audio Processing on Blind Source-Separated Signals

Figure 6:
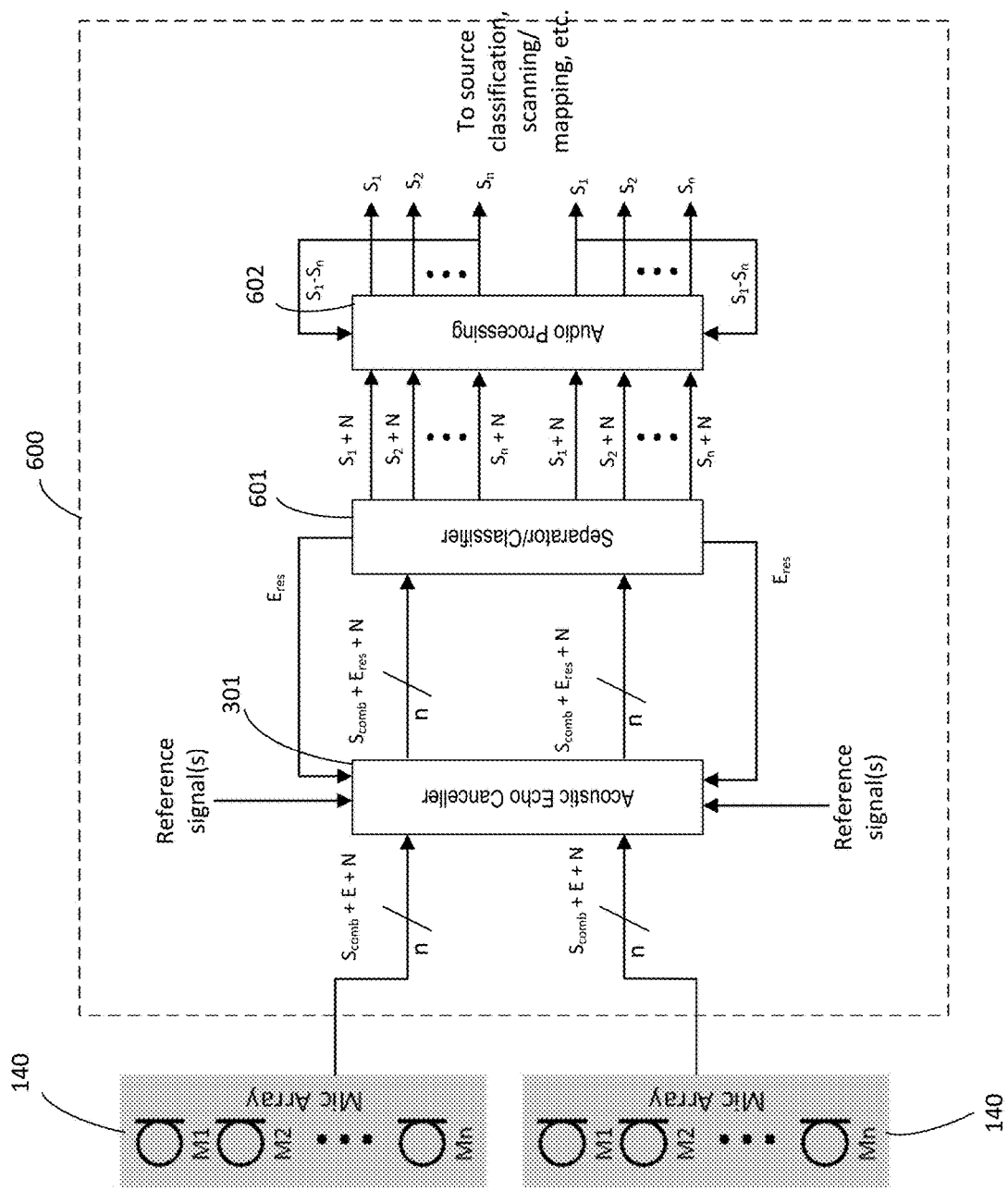
FIG. 6 illustrates a portion of an example of an audio processing system configured to separate sound sources and perform digital signal processing operations, according to certain embodiments.

FIG. 6 shows a portion 600 of an audio processing system in detail and can be a portion of the audio processing engine 125 of FIGS. 3A-3E, for example. As shown, the fixed or adaptive AEC 301 receives n input signals from the microphone elements M1-Mn. Each of the input signals include a mixed source combined signal component $S_{comb}$, an echo component E, and a noise component N.

The AEC 301 also receives a reference signal (e.g., a far end signal), which the AEC 301 uses in the echo cancellation process. The AEC 301 outputs n signals each including combined signal component $S_{comb}$, a residual echo component $E_{res}$, and a noise component N, which can generally include any unwanted signal.

A separator/classifier 601 separates the echo-cancelled signal into n separate source signals, which each include a separated source component Sn and a noise component N. The separator/classifier 601 can additionally classify the separated signals or additionally process the signals. For example, the separator/classifier 601 can include any combination of the functionality of the blind source separator 302, source classifier 304, and speech source processor 306 of FIGS. 3A-3E. The separator/classifier 601 also outputs a residual echo component $E_{res}$, which is provided to the AEC 301 to cancel residual echo.

An audio processing block 602 receives n separated source signals. According to the illustrated embodiment, the audio processing block 602 performs one or more audio digital signal processing operations to remove or reduce the noise component N from the source separated signal, thereby outputting clean source separated signals $S_1$-$S_n$ for each microphone for subsequent processing and output, such as by the speech source processor 306 or audio processing unit 308 of the audio processing engine 125 of FIGS. 3A-3E. The audio digital signal processing operations include, without limitation, mixing, equalization, parametric filtering, peak limiting, noise gating, spectral masking, and dynamic range compression/expansion. While a single DSP operation is shown, in some implementations, any of the listed DSP operations or others can be performed, e.g., sequentially in any order. The audio processing block 602 can be the audio processing unit 308 of FIGS. 3A and 3E, for example.

As shown, the audio processing block 602 can receive the source separated signals as feedback for use in the noise suppression or other digital signal processing operation. For example, depending on the type of digital signal processing operation, the audio processing block 602 processes the output signal $S_1$ to improve noise suppression on the output signal $S_1$, processes the output signal $S_2$ to improve noise suppression on the output signal $S_2$, and so forth. Depending on the embodiment, the audio processing block 602 can receive other signals as feedback for improving operation of the audio processing block 602. For example, the audio processing block 602 can process some or all of the output signals $S_2$-$S_n$ to suppress noise in the output signal $S_1$ and/or other signals (e.g., far end signals).

Auditory Scene Analysis Method

Figure 7:
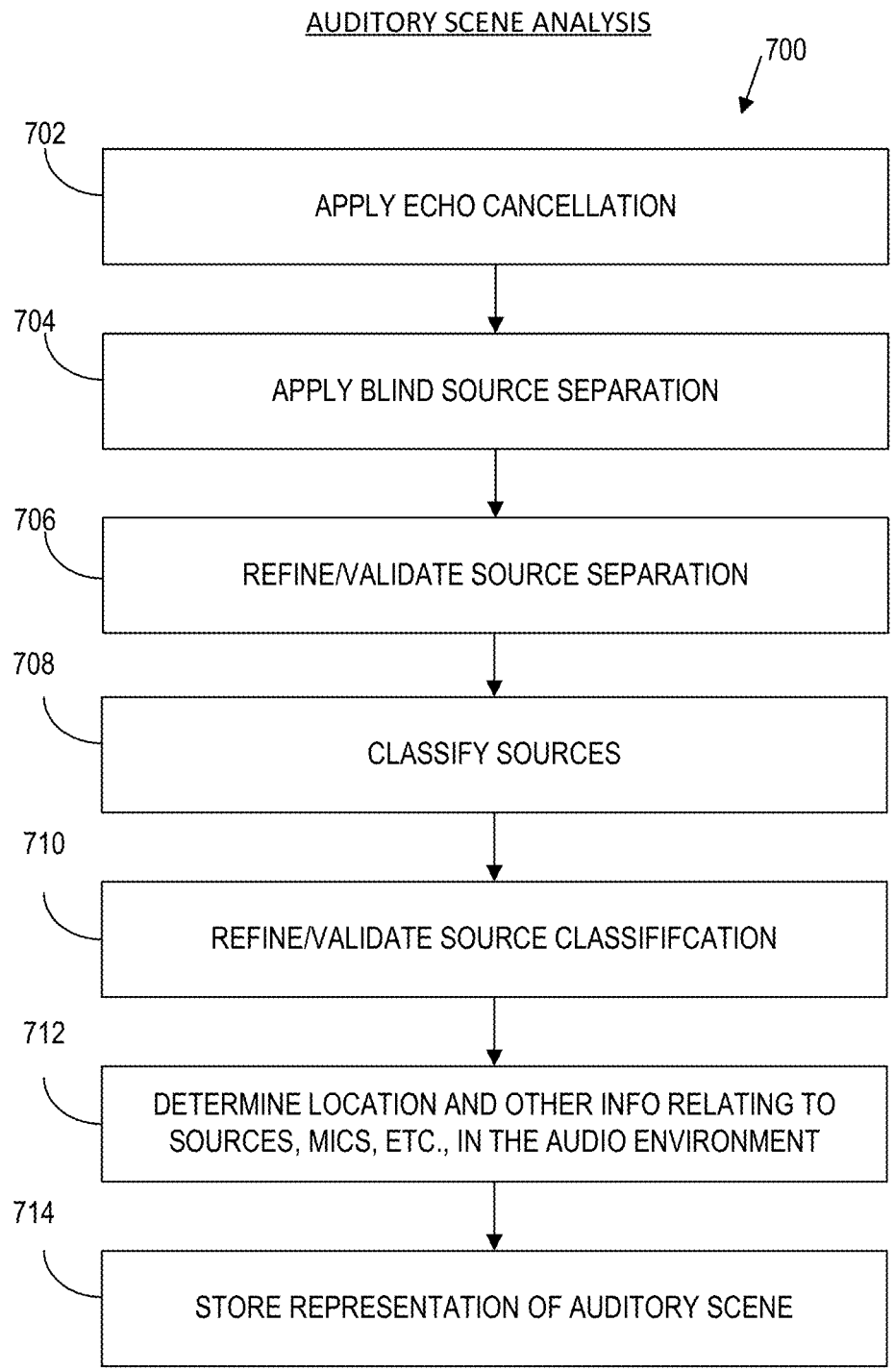
FIG. 7 is a flowchart depicting a method of performing auditory scene analysis using separated sound sources detected by an audio system, according to certain embodiments.

FIG. 7 illustrates an example method 700 of performing an auditory scene analysis on the environment in which the audio processing system 100 is deployed.

At step 702, the audio processing engine 125 can optionally apply fixed or adaptive acoustic echo cancellation with the optional acoustic echo canceller 301 to audio signals detected by the microphone arrays 140, as described with respect to FIGS. 3A-3E. In some other embodiments, the audio processing engine 125 can apply beamforming instead of or in addition to echo cancellation.

At step 704, the blind source separator 302 can use any of the techniques described herein (e.g., with respect to FIGS. 3A and 3B) to separate the sources of the detected audio content into an initial set of separated sources.

At step 706 audio processing engine 125 uses additional information to refine, validate, or otherwise assist in the source separation. For example, the audio processing engine 125 can process the detected audio content to determine one or more of inter- or intra-microphone 140 level differences, inter- or intra-microphone 140 time differences, inter- or intra-microphone 140 phase differences, or detected pitch, and use some or all of this information to assist in refining or validating the source separation. The audio processing engine 125 can also use deep neural network models or other artificial intelligence models to refine, validate, or otherwise assist the source separation at step 706.

At step 708, the audio processing engine 125 can use any of the techniques described herein (e.g., with respect to FIGS. 3A and 3C) to classify and categorize the identified sources into a classified set of sound sources, such as into speech, non-speech, and diffuse classifications and/or sub-classifications.

At step 710, the audio processing engine 125 uses one or more deep neural network models or other artificial intelligence models to refine, validate, or otherwise assist the source classification.

At step 712, the audio scene analyzer 129 or other component of the audio processing system 121 determines or updates a location of one or more the separated, classified sources in the audio environment, a location of one or more microphones in the environment, or other relevant information relating to the auditory scene, which can include any of the information stored in the tables 400, 402, 404 of FIGS. 4A-4C or in the environment repository 112 of FIG. 3A. The audio processing system 121 can use a variety of different types of information in order determine locations of the sources including, without limitation, the direction of arrival of detected source (e.g., from direction of arrival blocks 318, 328) and signal magnitude of detected source.

As one example, referring to FIG. 2C, the audio processing system 121 can separate and classify the speech uttered by the person 204a, and determine a position of the person 204a relative to the microphone 140b by using direction of arrival to determine an approximate angle at which the person 204a is situated relative to the microphone 140b, using magnitude to determine an estimated distance between the microphone 140b and the person 204a, and using the angle and magnitude, together with a known position of the microphone 140b, to determine an estimated position of the person 204a in the room 200d.

The audio processing system 121 can use information from multiple microphones 140 to determine the location of the sources in the audio environment. As an example, referring again to FIG. 2C, the microphone 140d can also detect speech uttered by the person 204a, and the audio processing system 121 can use a determined direction of arrival and magnitude corresponding to the person's 204a detected speech to determine an estimated angle at which the person 204a is situated relative to the microphone 140d and estimated distance between the microphone 140d and the person 204a, and use the angle and distance, together with a known position of the microphone 140d, to determine an estimated position of the person 204a in the room 200d.

The audio processing system 121 can then use the approximate position determined using sound detected by the microphone 140b, the approximate position determined using the sound detected by the microphone 140d, and known positions of the two microphones 140b, 140d to refine or confirm the estimated position of the person 204a.

At step 714, the audio processing engine 125 can update the representation of the auditory scene in the environment repository 112, such as to update a relational database including the tables 500, 502, 504 of FIGS. 5A-5C.

Flexible Microphone Geometries

Figure 8:
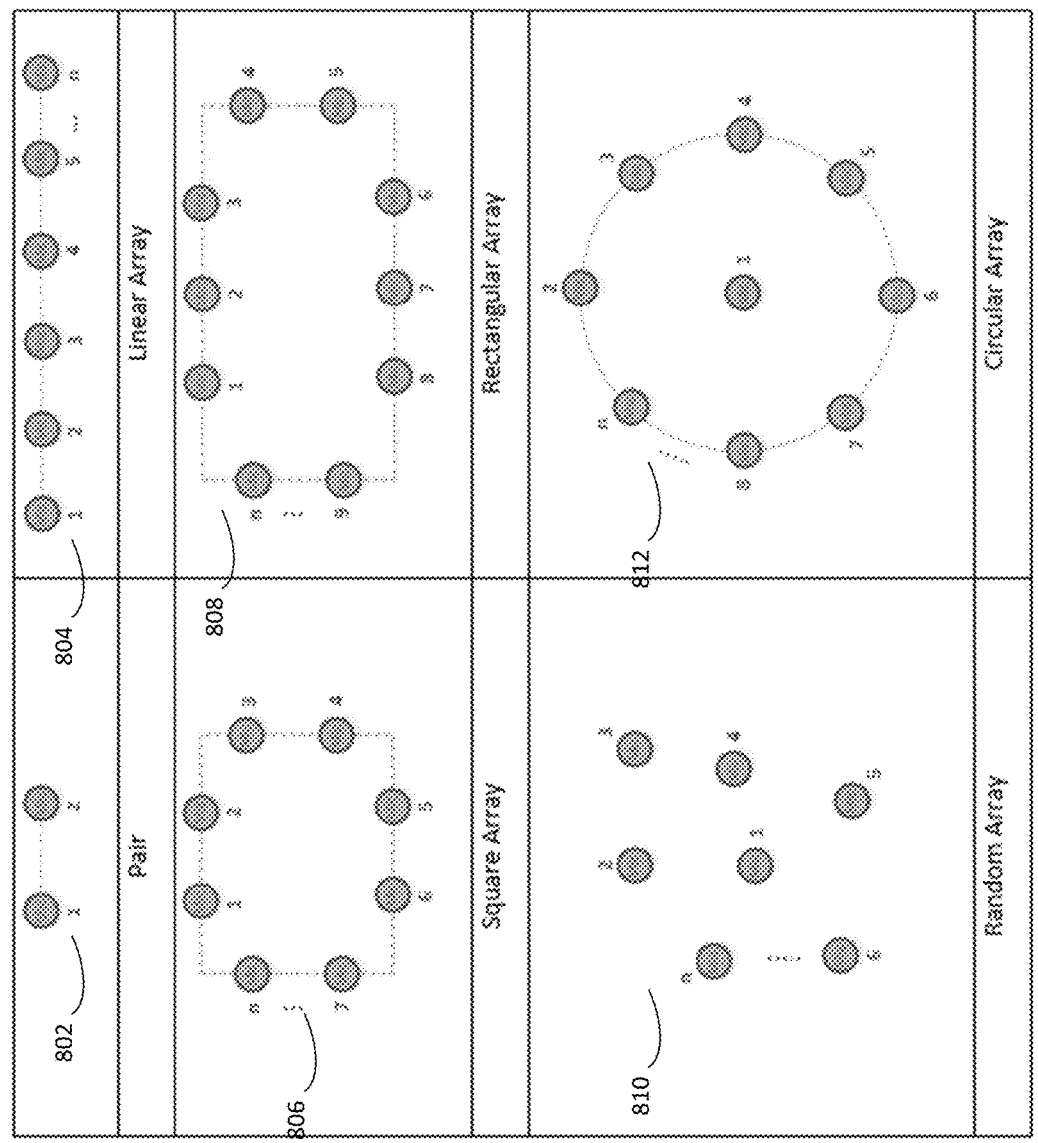
FIG. 8 shows examples of different microphone array geometries that can be used in the audio systems described herein.

The audio processing techniques employed by the systems described herein, including those that use blind source separation, allow for flexible microphone design. Any of the systems described herein can deploy a variety of different types of microphone arrays, or combinations of different types of microphone arrays. FIG. 8 shows some examples, wherein the individual microphone elements 1-$n$ are arranged in the following geometries: pair 802, linear 804, square 806, rectangular 808, random 810, and circular 812. Depending on the embodiment, inclusion of additional microphone elements in the array 140 can enable more accurate source separation.

In some embodiments, the system 100 can include one or more microphones including a single microphone element in addition to one or more arrays 140 having multiple elements. For instance, the system 100 can perform source separation and the other techniques described herein on audio detected by a single microphone 140, or on an audio stream received from a single remote laptop, smartphone or other conferenced device.

Flexible Microphone Placement and Installation

Configuring microphone systems that rely solely or primarily on directionality for source detection often involves careful aiming of lobes to avoid noise sources or other distractions, specific to the room space, often at the expense of limiting movement of participants to specific coverage areas. As one example, if two microphone arrays 140 are placed on a table, and, in a system that relied on beamforming, one beam of each microphone 140 might point into the space on the table between the microphones, and those beams will interfere/overlap with other beams, and without robust source separation, an installer may decide to disable those beams to avoid interference.

Embodiments described herein providing robust source separation allow for more flexible placement and installation. For example, when setting up two or more microphone arrays 140, installers do not have to disable overlapping microphones 140 or beams within microphones 140 because any sources detected by multiple microphones 140 can be extracted and processed appropriately by the audio processing engine 125. Moreover, because the audio processing engine 125 can continuously perform an auditory analysis of the meeting room space or other audio environment, including by tracking the position of components and people within the space, the audio processing engine 125 can automatically adjust configuration as the location or nature of audio sources change.

The source separation-based audio processing techniques described herein also enable flexible placement of microphones in the audio environment. For example, rather than having to install a microphone on a table at a fixed position and orientation (e.g., mounted to a hole drilled in the table with lobes pointing at chairs), robust sources separation allows for users to adjust the position/orientation of the microphone 140 (e.g., making drilling/mounting to table in fixed orientation optional), or for users to move freely with respect to the microphone 140 while maintaining consistent performance and source detection.

Example of a Microphone Array

Figure 9:
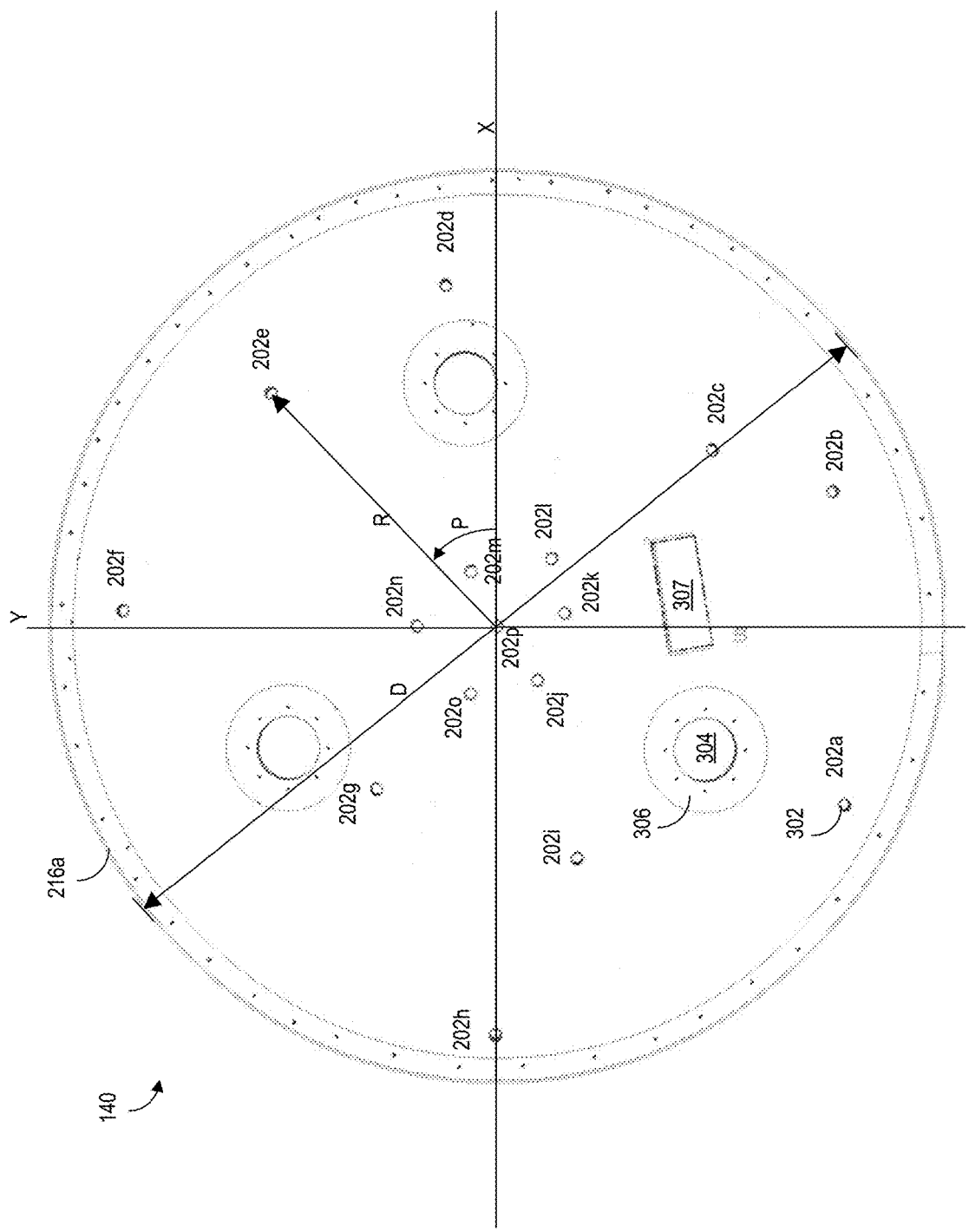
FIG. 9 illustrates an example of a microphone array that is compatible with the audio systems and methods described herein.

FIGS. 9 depicts a view of a microphone array 140 including microphones 202a-202p arranged on a board 216a of one example of a compatible microphone array 140.

In one embodiment, the microphones 202a-202p are housed in integrated circuit packages mounted to the bottom of the board 216a (not shown), and the top board 216a includes a plurality of circular holes 302 each corresponding to, and exposing a portion of the underside of, a corresponding one of the microphones 202a-202p. The holes 302 can facilitate detection of sound waves by the microphones 204a-204p incident on the microphone system 140 from the top of the top board 216a through the housing 200.

The microphones 202a-202p of the embodiment illustrated in FIG. 9 each omnidirectional piezo electric MEMS-based acoustic microphone transducers capable of detecting sound in a frequency range of 10 Hz to 20,000 Hz and a high linearity frequency range of 80 Hz to 8,000 Hz, and are housed in integrated circuit packages mounted on the top board 216a. In other embodiments, other types of microphones can be used such as dynamic or condenser microphones.

The microphones 202a-202p of the illustrated embodiment include a first group of nine microphones 202a-202i and a second group of seven microphones 202j-202p. The processor 122 can process and/or combine signals output from the first group of microphones 202a-202i to generate sound content within a first frequency range, and process and/or combine signals output from the second group of microphones 202j-202p to generate output sound content within a second frequency range.

For example, the processor 122 may filter signals output by the first group of microphones 202a-202i using one or more first filters (e.g., bandpass filters), and combine the filtered outputs to generate processed audio within the first frequency range, and filter signals output by the second group of microphones 202j-202p using one or more second filters (e.g., bandpass filters), and combine the filtered outputs to generate processed audio within the second frequency range.

The second frequency range according to some embodiments is higher than the first frequency range, although the frequency ranges can overlap somewhat. In some embodiments, the maximum frequency of the first frequency range and the minimum value of the second frequency range are values at which the first group and the second group have similar noise performance. A variety of possible values are possible for the first and second frequency ranges. Here just a few examples:

| First Frequency Range (Hz) | Second Frequency Range (Hz) |
|---|---|
| 20-1,200 | 1,200-20,000 |
| 80-1,200 | 1,200-20,000 |
| 20-2,000 | 2,000-20,000 |
| 80-2,000 | 2,000-20,000 |
| 20-3,000 | 3,000-20,000 |
| 80-3,000 | 3,000-20,000 |
| 80-,1,200 | 1,200-8,000 |
| 80-2,000 | 2,000-8,000 |
| 80-3,000 | 3,000-8,000 |

While the examples provided indicate that the first and second frequency ranges overlap exactly at a single value (1,200, 2,000, or 3,000 Hz), in some embodiments the ranges can have larger overlaps, such as by 5, 10, 100, 1,000, 2,000, 3,000, 5,000 or more Hz, or by values between these amounts. Depending on the embodiment, the combined first and second frequency ranges can at least cover certain voice frequency bands, such as 300-3,400 Hz, 50-7,000 Hz, 50-14,000 Hz, or 20-20,000 Hz. The frequency range can be relatively broad to capture not only speech bandwidths, but other sounds for improved noise handling or other purposes.

Terminology/Additional Embodiments

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

What is claimed is:

1. A conferencing system comprising:
a plurality of microphones, the plurality of microphones including at least first and second microphones positioned in a conferencing environment, the first microphone configured, responsive to detected sound, to generate at least one first audio signal, the second microphone configured, responsive to detected sound, to generate at least one second audio signal; and
one or more processors executing an audio processing system and operatively coupled to the plurality of microphones, the audio processing system configured to:
perform one or more blind source separation operations on the first audio signal to generate a first plurality of source-separated audio signals each corresponding to a different audio source;
perform one or more blind source separation operations on the second audio signal to generate a second plurality of source-separated audio signals each corresponding to a different audio source;
process a first source-separated signal of the first plurality of source-separated audio signals to identify a first type of audio source corresponding to the first source-separated signal;
process a second source-separated signal of the second plurality of source-separated audio signals to identify a second type of audio source corresponding to the second source-separated signal,
wherein at least one of the first or second types is a non-speech source;
classifying the non-speech source into a semantic category;
identify, using an event activity detection technique, the non-speech source as an event, wherein the event corresponds to the semantic category;
in response to the identification of the semantic category and corresponding event, implement a response action by adjusting audio output characteristics or video characteristics of a peripheral communicably coupled to the audio processing system; and
generate an output audio stream including audio content from one or both of the first source-separated signal and the second source-separated signal, the output stream generated at least in part based on one or more of direction of arrival information, signal strength information, and the adjusted audio or video characteristics.

2. The conferencing system of claim 1 wherein the audio processing system is further configured to adapt, using an artificial intelligence model, the audio processing system to the conferencing environment.

3. The conferencing system of claim 2 wherein the artificial intelligence model is trained using data detected by the audio processing system.

4. The conferencing system of claim 3 wherein the audio processing system is further configured to, using one or more of direction of arrival and signal strength information, determine a physical position of a human speaker, and to track the physical position of the human speaker as the human speaker moves.

5. The conferencing system of claim 1 wherein the audio processing system is configured to:
identify one or more residual echo signals amongst the first plurality of source-separated audio signals and the second plurality of source-separated audio signals; and
enhance acoustic echo cancellation using the residual echo signals.

6. The conferencing system of claim 1 wherein at least one of the first and second types is a speech source, and the audio processing system determines an emotion or sentiment of a human who generated the speech source.

7. The conferencing system of claim 6 wherein:
the emotion or sentiment is added to a transcription of the speech source such that the emotion or sentiment is transcribed with the speech source.

8. A conferencing method comprising:
with one or more processors operatively coupled to a plurality of microphones positioned in a conferencing environment:
performing one or more blind source separation operations on at least one first audio signal generated by a first microphone of the plurality of microphones to generate a first plurality of source-separated audio signals each corresponding to a different audio source;
performing one or more blind source separation operations on at least one second audio signal generated by a second microphone of the plurality of microphones to generate a second plurality of source-separated audio signals each corresponding to a different audio source;
processing a first source-separated signal of the first plurality of source-separated audio signals to identify a first type of audio source corresponding to the first source-separated signal;
processing a second source-separated signal of the second plurality of source-separated audio signals to identify a second type of audio source corresponding to the second source-separated signal,
wherein at least one of the first or second types is a non-speech source;
classifying the non-speech source into a semantic category;
identifying, using an event activity detection technique, the non-speech source as an event, wherein the event corresponds to the semantic category;
in response to the identification of the semantic category and corresponding event, implementing a response action by adjusting audio output characteristics or video characteristics of a peripheral communicably coupled to the audio processing system; and
generating an output audio stream for playback, the output audio stream including audio content from one or both of the first source-separated signal and the second source-separated signal, the generating based at least in part on one or more of direction of arrival information, signal strength information and the adjusted audio or video characteristics.

9. The method of claim 8 wherein the first and second types of audio sources are the same type.

10. The method of claim 9 wherein the first and second source-separated signals correspond to the same human speaker speech source.

11. The method of claim 10 further comprising, with the one or more processors, using one or more of direction of arrival and signal strength information, determining a physical position of the human speaker, and tracking the physical position of the human speaker as the human speaker moves.

12. The method of claim 8 wherein:
at least one of the first and second types is a speech source, and the audio processing system determines an emotion or sentiment of a human who generated the speech source;
the emotion or sentiment is added to a transcription of the speech source such that the emotion or sentiment is transcribed with the speech source.

13. The method of claim 8 comprising, with the one or more processors, using direction of arrival information relating to one or both of the first and second source-separated signals in generating the output audio stream.

14. The method of claim 8 comprising, with the one or more processors, using signal strength information relating to one or both of the first and second source-separated signals in generating the output audio stream.

15. The method of claim 8 further comprising, with the one or more processors, applying a first audio signal processing operation on the first source-separated audio signal based on the identified first type, and applying a second audio signal processing operation on the second source-separated audio signal based on at least the identified second type, wherein the first and second audio processing operations are different.

16. The method of claim 8 further comprising, with the one or more processors:
identifying one or more residual echo signals amongst the first source-separated audio signals and the second source-separated audio signals; and
improving acoustic echo cancellation using the residual echo signals.

17. The method of claim 8 further comprising, with the one or more processors, determining a direction of arrival of one or more of the first plurality of source-separated audio signals and one or more of the second plurality of source-separated audio signals based on based on time or phase delays between individual microphone elements.

18. The method of claim 8 wherein the first type is a noise source, the second type is a speech source, and the method further comprises, with the one or more processors, omitting or reducing a contribution from the first source-separated signal in the output audio stream relative to content from the second source-separated signal.

19. A non-transitory computer readable storage medium storing instructions that, when executed by a computing system, cause the computing system to perform operations comprising:
performing one or more blind source separation operations on at least one first audio signal generated by a first microphone of a plurality of microphones to generate a first plurality of source-separated audio signals each corresponding to a different audio source;
performing one or more blind source separation operations on at least one second audio signal generated by a second microphone of the plurality of microphones to generate a second plurality of source-separated audio signals each corresponding to a different audio source;
processing a first source-separated signal of the first plurality of source-separated audio signals to identify a first type of audio source corresponding to the first source-separated signal;
processing a second source-separated signal of the second plurality of source-separated audio signals to identify a second type of audio source corresponding to the second source-separated signal,
wherein at least one of the first or second types is a non-speech source;
classifying the non-speech source into a semantic category;
identifying, using an event activity detection technique, the non-speech source as an event, wherein the event corresponds to the semantic category;
in response to the identification of the semantic category and corresponding event, implementing a response action by adjusting audio output characteristics or video characteristics of a peripheral communicably coupled to the audio processing system; and
generating an output audio stream for playback, the output audio stream including audio content from one or both of the first source-separated signal and the second source-separated signal, the generating based at least in part on one or more of direction of arrival information, signal strength information and the adjusted audio or video characteristics.

20. The non-transitory computer readable storage medium of claim 19, wherein: at least one of the first and second types is a speech source, and the audio processing system determines an emotion or sentiment of a human who generated the speech source; and the emotion or sentiment is added to a transcription of the speech source such that the emotion or sentiment is transcribed with the speech source.

* * * * *